US006831693B1

(12) United States Patent
Sunaga

(10) Patent No.: US 6,831,693 B1
(45) Date of Patent: Dec. 14, 2004

(54) IMAGE PICKUP UNIT HAVING LIGHT INCIDENT SIDE REFLECTING ELEMENT AND DRIVE MEANS FOR DRIVING REFLECTING ELEMENT, AND APPARATUS HAVING SAME

(75) Inventor: Toshihiro Sunaga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 778 days.

(21) Appl. No.: 09/694,507

(22) Filed: Oct. 24, 2000

(30) Foreign Application Priority Data

Oct. 27, 1999 (JP) .......................................... 11-305414

(51) Int. Cl.⁷ .......................... H04N 5/225; H04N 7/00; G02B 5/08
(52) U.S. Cl. ...................... 348/335; 348/218.1; 348/37; 359/857
(58) Field of Search .............................. 348/335, 218.1, 348/214.1, 208.11, 208.8, 36, 37, 219.1; 359/857, 654

(56) References Cited

U.S. PATENT DOCUMENTS

| | | | | |
|---|---|---|---|---|
| 3,959,582 A | * | 5/1976 | Law et al. ..................... 348/37 |
| 5,455,685 A | * | 10/1995 | Mori ........................... 348/363 |
| 5,557,469 A | * | 9/1996 | Markle et al. ............... 359/683 |
| 5,825,560 A | | 10/1998 | Ogura et al. |
| 5,838,374 A | * | 11/1998 | Kikuchi ....................... 348/351 |
| 5,889,553 A | * | 3/1999 | Kino et al. ................. 348/218.1 |
| 5,907,353 A | * | 5/1999 | Okauchi ................... 348/218.1 |
| 5,973,850 A | * | 10/1999 | Nagaoka ..................... 359/654 |
| 6,034,716 A | * | 3/2000 | Whiting et al. ............... 348/36 |
| 6,270,224 B1 | * | 8/2001 | Sunaga et al. .............. 359/857 |
| 6,320,611 B1 | * | 11/2001 | Pepin .......................... 348/147 |
| 6,654,063 B1 | * | 11/2003 | Tadatsu ....................... 348/373 |
| 2001/0043264 A1 | * | 11/2001 | Sinclair et al. ............... 348/36 |
| 2002/0176017 A1 | * | 11/2002 | Hayashi et al. ............. 348/335 |

FOREIGN PATENT DOCUMENTS

| | | |
|---|---|---|
| EP | 0 730 180 | 2/1996 |
| EP | 0 790 513 | 8/1997 |
| JP | 6-326900 | 11/1994 |
| JP | 8-292371 | 11/1996 |
| JP | 8-292372 | 11/1996 |
| JP | 9-5650 | 1/1997 |
| JP | 9-222561 | 8/1997 |
| JP | 9-331473 | 12/1997 |

\* cited by examiner

Primary Examiner—Andrew Christensen
Assistant Examiner—Lin Ye
(74) Attorney, Agent, or Firm—Fitzpatrick, Cella, Harper & Scinto

(57) ABSTRACT

An image pickup unit for changing an orientation of an image pickup field by constructing a common portion as a unit. The image pickup unit preferably has an image pickup medium, an optical system through which an image of an object is formed, a reflecting member which is disposed at the position nearer the side of the object than that of the optical system, a reflecting member driver for driving the reflecting member, an interface for enabling communication with an apparatus main body which (i) has therein the image pickup unit and (ii) generates a signal to control an operation of the image pickup unit, and a microcomputer which (i) transmits information on the side of the image pickup unit to the apparatus main body and (ii) controls the reflecting member driver on the basis of the signal received from the apparatus main body. Preferably, the reflecting member driver drives the reflecting member, thereby changing the orientation of the image pickup field of the image pickup medium.

17 Claims, 18 Drawing Sheets

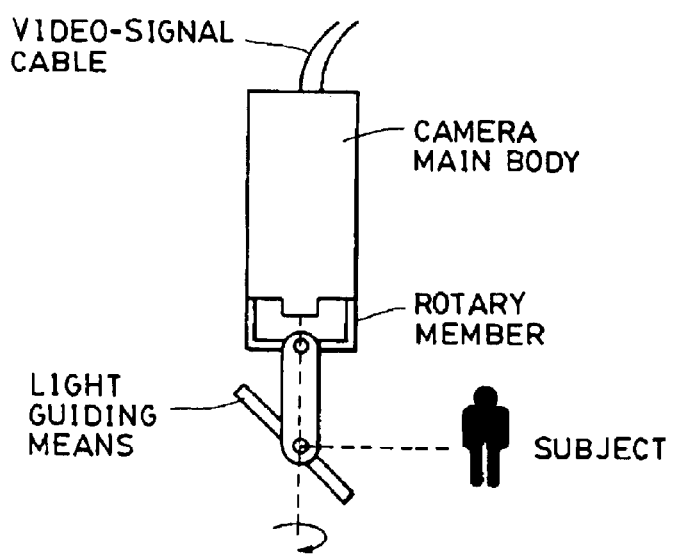

IMAGE PICKUP UNIT HAVING LIGHT INCIDENT SIDE REFLECTING ELEMENT AND DRIVE MEANS FOR DRIVING REFLECTING ELEMENT, AND APPARATUS HAVING SAME

BACKGROUND OF THE INVENTION

1. Field of the Invention

The present invention relates to an image pickup unit by which an image pickup range (field) can be changed, and more particularly, to an image pickup unit which is suitable for use in a video telephone, portable terminal, computer, vehicle-on camera, monitoring camera, endoscope, etc.

2. Description of the Related Art

As readily understood from a monitoring camera etc., generally, apparatuses for enabling the change of a field are structured so as to move the whole camera (comprising the image pickup system) and, thereby, the space necessary for photographing is large and a consumption power is also large.

A video camera and a digital camera are also structured so that images in front and behind the camera can be photographed by rotating a lens in order to enable a photographed person to be easily photographed.

FIG. 18 illustrates an image pickup device disclosed in Japanese Patent Laid-Open No. 9-331473. FIG. 19 illustrates a schematic construction of a lens unit which is provided in the image pickup device. A reflecting mirror is provided between the lens unit and an image pickup medium (CCD) and a field can be changed by horizontally rotating the lens unit and the reflecting mirror.

As mentioned above, by using a structure such that a reflecting member for reflecting light from an object in an optical system is provided and a field is changed by rotating the reflecting member and the optical system on the side of the reflecting member to the object while an optical axis from the reflecting member to the image pickup medium is set as an axis, a space necessary for photographing can decrease and the image pickup device can also become compact.

FIG. 20 is a video camera disclosed in Japanese Patent Laid-Open No. 6-326900. In this video camera, a camera main body is fixed, and light from an object to be photographed is made incident to a lens by light guiding means which is provided on the front side of the lens in the camera main body. The light guiding means is mounted to a rotary member, thereby rotating at 360° to the camera main body. Further, a video processing circuit is used and, thereby, a photographed image as an erect image can be displayed on a screen in accordance with the rotation of the light guiding means.

As described above, the reflecting member is provided in front of the optical system and the reflecting member is moved and thus a field can be changed.

According to a method disclosed in Japanese Patent Laid-Open No. 9-5650 in a decentered-axis optical system (and examples disclosed in Japanese Patent Laid-Open Nos. 8-292371, 8-292372, and 9-222561 discussed therein), a concept of a reference axis is introduced, and a constructing surface is an asymmetrical asphere and thus the structure of an optical system in which aberration is corrected efficiently is possible.

The decentered-axis optical system is called as an off-axial optical system (in the case of considering a reference axis along a ray of light passing through the center of an image <or the center of an object> and the center of the pupil, this optical system is defined as an optical system including a curved surface <off-axial curved surface> in which no normal of a surface at the cross point of the reference-axis and the constructing surface exists on the reference axis, and the reference axis is refracted in this case). Typically, according to the off-axial optical system, a constructing surface has a decentered axis and no vignetting occurs on the reflecting surface and, therefore, it is easy to structure the optical system using the reflecting surface. The off-axial optical system also has characteristics in that it is easy to form an integral-type optical-system by using a method of integrally forming the constructing surface.

On the other hand, a conventional optical system having only a refracting optical device has a problem that an incident pupil is located at a deep position in the optical system (in many cases) and, as an interval for a plane of incidence which is located at a position-which is the nearest to the side of the object in the case of seeing from a stop is larger, an optical effective diameter of the plane of incidence becomes larger in accordance with the enlargement in an angle of view.

In addition to the aforementioned examples, an image pickup system the which a field can be changed is indispensable for devices such as an image pickup system used for a video telephone, a digital camera provided in a computer and a portable terminal, an endoscope, and a on-vehicle camera in which an observer cannot directly move the image pickup system. The range of applications of an image pick-up system in which the field can be changed is wide.

However, in the case of using the structure such that the whole camera is moved as mentioned above, the structure is largely influenced depending on forms of devices having therein the image pickup system wherein the field can be changed. Consequently, it is necessary to design the image pickup system for every such a device. This results in an increase in costs of the image pickup system and also a rise in price of the device having therein the image pickup device. If the size of the image pickup system is large, it cannot be provided in the portable terminal, etc. Further, if a consumption power is large when the field changes, this causes an available time of the portable terminal, etc. to become short.

SUMMARY OF THE INVENTION

Accordingly, it is an object of the present invention to provide an image pickup unit for improving the flexibility of the device by extracting a common portion in an image pickup system in which an image pickup range (field) can change and by constructing the common portion as a unit and for making it advantageous to reduce costs of a variety of apparatuses in which the image pickup system is provided.

In order to accomplish the above object, according to a first aspect of the present invention, there is provided an image pickup unit having an image pickup medium, an optical system through which an image of a object is formed on the image pickup medium and, a reflecting member which is disposed at the position nearer the side of the object than the side of the optical system, to which light from the object reflects so as to be made incident to the optical system, wherein the reflecting member is driven (for example, rotated and driven), thereby the image pickup range of the image pickup medium is changed. Further, the image pickup unit has reflecting member drive means for driving the reflecting member, an interface for enabling the communication with an apparatus main body which has therein the image pickup unit and generates a signal to control an operation of the image pickup unit, and a microcomputer which transmits information on the side of the image pickup unit to the apparatus main body and controls the reflecting member drive means on the basis of the signal received from the apparatus main body.

According to a second aspect of the present invention, there is provided an image pickup unit having an image pickup medium, an optical system through which an image of a object is formed on the image pick medium, and a reflecting member which is disposed in the optical system, wherein light from the object which is incident through a portion constructing the optical system at the position nearer the side of the object than that of the reflecting member is reflected to the reflecting member and is made incident to the portion comprising the optical system at the position nearer than the side of a surface of an image than that of the reflecting member, and an orientation of image pickup field changes by driving (for example, rotating and driving) the reflecting member and the portion comprising the optical system by the image pickup medium. Further, the image pickup unit has reflecting member drive means for driving the reflecting member, an interface for enabling the communication with an apparatus main body which has therein the image pickup unit and generates a signal to control an operation of the image pickup unit, and a microcomputer which transmits information on the side of the image pickup unit to the apparatus main body and controls the reflecting member drive means on the basis of the signal received from the apparatus main body.

In other words, the image pickup unit according to this aspect of the present invention adopts the image pickup system in which the orientation of the image pickup field or the image pickup medium is changed by driving the reflecting member which is disposed at the position on the side of the object nearer than that of the optical system, alternatively, by driving the reflecting member which is disposed in the optical system and the portion constructing the optical system which is located at the position on the side of the object nearer than that of the reflecting member. Thus, the space necessary for variation in the image pickup range is small, and not only the image pickup system but also the image pickup unit including it become compact. Further, the image pickup range changes by driving the reflecting member or driving the reflecting member and only the portion comprising the optical system at the position on the side of the object nearer than that of the reflecting member and, thereby, a more power consumption decreases as compared with that in the case of rotating the whole camera or the whole image pickup system.

Moreover, the image pickup unit may have therein the drive means for driving the change in the image pickup range, the interface for enabling the communication with the apparatus main body (such as a video telephone, portable terminal, computer, on-vehicle camera, monitoring camera, and endoscope), and the microcomputer for controlling the driving operation of the change in image pickup range on the basis of the signal from the apparatus main body. Processing functions for at least the field change operation of the image pickup system are collected together in the image pickup unit.

Accordingly, it is possible to realize a generalized and compact image-pickup unit in which the image pickup range can change and to provide the image pickup unit in various apparatuses.

Incidentally, the image pickup unit may have not only the field-change functions but also processing functions, e.g., zooming, focusing, and exposure correcting operation.

Preferably, the optical system of the image pickup unit according to the present invention may have a stop which is located at the position which is the nearest to the object, or have a stop in the optical system in a manner such that an image through the stop is formed on the side of the object nearer than that of the stop by the portion constructing the optical system thereon at a negative magnification.

Thus, the increase in the optical effective diameter on a plane of incidence can be reduced as compared with the conventional optical system having only a refracting optical device, and this makes it advantageous in that the optical system and the image pickup unit may become compact.

Further objects, features and advantages of the present invention will become apparent from the following description of the preferred embodiments (with reference to the attached drawings).

BRIEF DESCRIPTION OF THE DRAWINGS

FIG. 20 is a schematic diagram of a conventional image pickup device in which the field can change.

DESCRIPTION OF THE PREFERRED EMBODIMENTS (First Embodiment)

Figure 1:
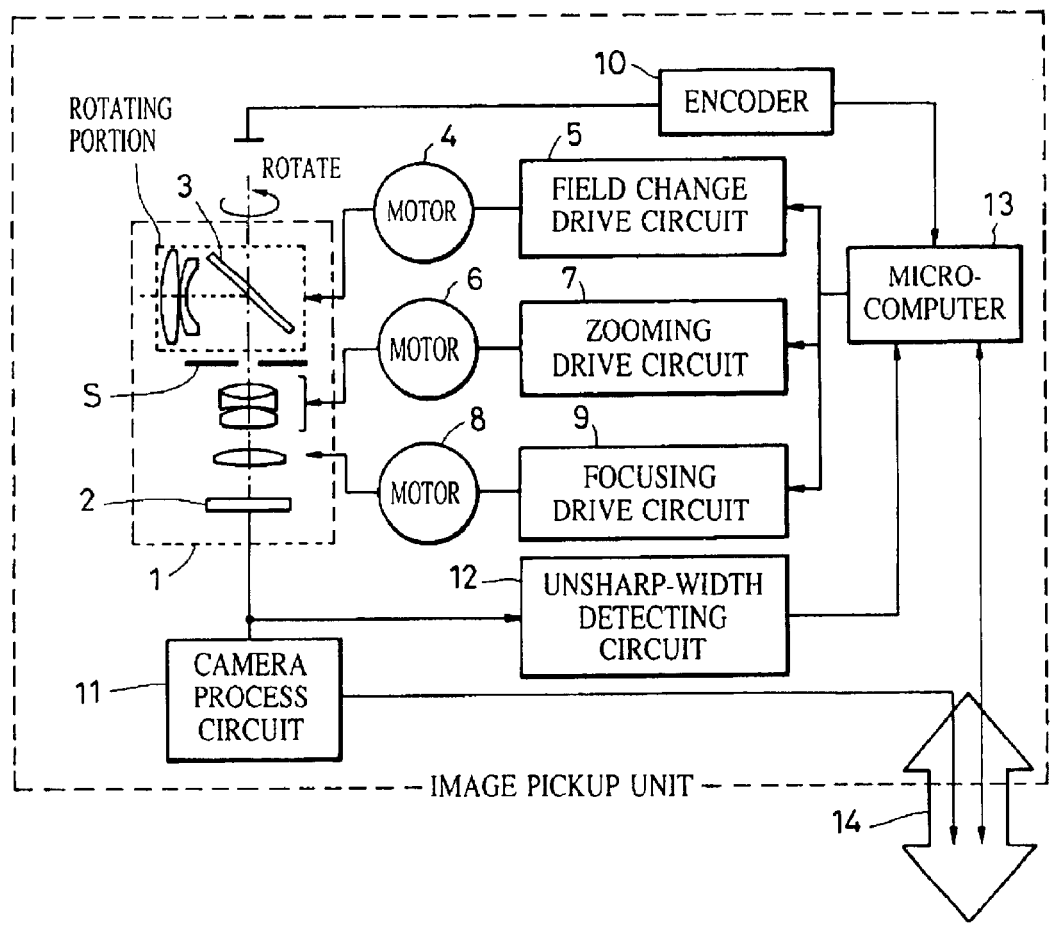
FIG. 1 is a block diagram showing a construction of an image pickup unit according to a first embodiment of the present invention.

FIG. 1 shows a schematic construction of an image pickup unit according to a first embodiment of the present invention. Referring to FIG. 1, reference numeral 1 denotes an image pickup system in which a field can change. A flat mirror (reflecting member 3 in the figure) and the portion of the optical system on the side of the object nearer than that of the flat mirror 3 (abbreviated to a rotary portion, hereinbelow) are rotatable. The optical axis of the portion of the optical system on the side of a surface of an image nearer than that of the flat mirror 3 (corresponding to the optical system in the first aspect of the present invention) is set as a central axis. Thereby, it is possible to change an image pickup range (field) for an image pickup device (image pickup medium) 2 such as a CCD and an MOS.

The image pickup device 2 included in the image pickup system 1 photoelectrically converts an image of an object (which is formed on a surface of an image pickup by the optical system) into a video signal.

As mentioned above, as compared with the case in which a portion from the optical surface that is nearest to the object to the image pickup surface (that is, the whole image pickup system) is rotated, a space necessary for the field change decreases in the case in which the flat mirror 3 and only the portion comprising the optical system at the position on the side of the object nearer than that of the flat mirror 3 are rotated.

According to the first embodiment, when a stop S is provided in the optical system, if the stop S is arranged near the flat mirror 3, the size of the flat mirror 3 can be reduced.

Reference numeral 4 denotes a motor for rotating the rotary portion and 5 denotes a field change drive circuit for driving the motor 4. Then, the motor 4 and the field change drive circuit 5 correspond to the reflecting member drive means. Reference numeral 10 denotes an encoder for detecting a rotary position of the rotary portion.

Reference numeral 6 denotes a motor for moving a zoom lens group in the optical system included in the image pickup system 1, and 7 denotes a zooming drive circuit for driving the motor 6. Then, the motor 6 and the zooming drive circuit 7 correspond to the zooming drive means.

Reference numeral 8 denotes a motor for moving a focus lens in the optical system included in the image pickup system 1, and 9 denotes a focusing drive circuit for moving the motor 8. Then, the motor 8 and the focusing drive circuit 9 correspond to the focusing drive means.

Reference numeral 11 denotes a camera process circuit for converting the video signal from the image pickup device 2 into a standard television signal and outputting the signal from a video output terminal. The television signal which is outputted from the camera process circuit 11 is transmitted to an apparatus main body, e.g., a video telephone, and a portable terminal via an interface 14 which is provided on the image pickup unit, which will be described hereinafter.

Reference numeral 12 denotes an unsharp-width detecting circuit (in-focus detecting means) for detecting a so-called unsharp width (width at an edge portion in the image of the object) of the image of the object in the video signal from the image pickup device 2 and, that is, for detecting an in-focus point by using the fact that, as the photographing state is nearer the in-focus state, the unsharp width of the object becomes smaller.

Reference numeral 13 denotes a microcomputer which controls the whole system, and has an I/O port, an A/D converter, a ROM, and a RAM. Unsharp width information which is outputted by the unsharp-width detecting circuit 12 and peak-value information having a high frequency component from a band-pass filter (not shown) are inputted to the microcomputer 13.

The microcomputer 13 outputs a predetermined drive control signal to the focusing drive circuit 9 on the basis of the information so as to drive the focusing operation of the image pickup system 1, so that the unsharp width for one field of the video image becomes minimum and the peak value of the high frequency component becomes maximum.

Reference numeral 14 denotes the interface which transmits image data and/or a signal indicative of an operating state of the image pickup unit to the apparatus main body, and receives an operational signal for controlling the operation of the image pickup unit which is generated by the apparatus main body. The present image pickup unit is connected to the apparatus main body, (e.g., the video telephone, the portable terminal etc. having therein the image pickup unit) via the interface 14.

Next, the operation of the image pickup unit will be described. When the operational signal for a field change is transmitted to the microcomputer 13 in the image pickup unit via the interface 14 from a microcomputer (not shown) on the side of the apparatus main body (such as the video telephone and the portable terminal having therein the image pickup unit), the microcomputer 13 analyzes the operational signal and transmits a drive signal to the field change drive circuit 5. The field change drive circuit 5 drives the motor 4 on the basis of the drive signal transmitted, rotates the rotary portion of the image pickup system 1, and changes the field which is photographed by the image pickup system 1.

The microcomputer 13 detects a position of the rotary portion by way of the encoder 10, processes positional information obtained from the encoder 10, and transmits the processed information as field information which is outputted by the image pickup system 1 to the microcomputer on the side of the apparatus main body through the interface 14.

Similarly, if an operational signal for a zooming operation from the apparatus main body is transmitted to the microcomputer 13 in the image pickup unit via the interface 14, the microcomputer 13 analyzes the operational signal and transmits a drive signal to the zooming drive circuit 7. The zooming drive circuit 7 drives the motor 6 on the basis of the drive signal transmitted and changes the zooming state of the image pickup system 1 by moving a part of the lens group of the image pickup system 1.

An image of the object to be photographed which is formed on the image pickup surface of the image pickup device 2 by the image pickup system 1 is photoelectrically converted into a video signal by the image pickup device 2 and is amplified by a preamplifier (not shown).

The amplified video signal is subjected to predetermined processes (such as a gamma correction, a blanking process, a process for adding a synchronous signal by the image pickup system 11), and thereby, is converted into a standard television signal which is standardized, and is transmitted to the apparatus main body via the interface 14.

According to the first embodiment, by using the image pickup system in which the field can change by rotating the flat mirror 3 and only the portion of the optical system at the position on the side of the object nearer than that of the flat mirror 3, the image pickup unit can become compact. Thus, the degrees of freedom of the apparatus main body can increase. Since the rotary portion of the image pickup system 1 is small, power consumption becomes small and the power consumption of the whole apparatus can be reduced.

Besides, according to the first embodiment, the microcomputer 13 is provided in the image pickup unit and performs processes for operations of the image pickup system 1 via the drive circuits 5, 7 and 9. In other words, the processing functions of the operations of the image pickup system 1 are collected together in the image pickup unit and, thereby, it is possible to provide the image pickup unit according to the present embodiment as a general unit in a variety of apparatuses. As compared with the case of designing an apparatus having an image pickup system therein, this makes it advantageous to lower the price of the image pickup unit and also the price of the apparatus. Further, as compared with the case in which the microcomputer disposed on side of the apparatus main body has the processing functions for the image pickup unit, the load of the microcomputer on the side of the apparatus main body can decreased more.

Although, according to the first embodiment, the image data obtained by the image pickup device 2 is converted into the standard television signal when it is transmitted to the apparatus main body, the present invention is not limited to the case of using the method of transmitting the image data.

Although, according to the first embodiment, the case in which the unsharp-width detecting circuit 12 is provided and the unsharp width of the image of the object is detected from among the video signal from the image pickup device 2 and the focusing operation is executed so that the unsharp width becomes minimum is described, a focusing method other than the foregoing may be adopted to the present invention. For example, a distance measuring unit for measuring a distance to the object may be provided and, in accordance with the output of by the distance measuring unit, the microcomputer 13 may transmit a drive signal to the focus driving circuit and may move a focus lens, thereby performing the focusing.

Although, according to the first embodiment, the case in which the focus lens is driven and, thereby, the focusing is performed as described, in place thereof, the image pickup device 2 may be moved. Further, a light measuring unit for measuring the brightness of the object may be provided and exposure correction may be controlled by driving the stop S by the microcomputer 13 on the basis of information obtained by the light measuring unit.

Although, according to the first embodiment, the case in which the zooming drive circuit 7 and the focusing drive circuit 9 are included as described, the present invention does not need such circuitry. That is, according to the present invention, the processing functions of the image pickup system may be collected together in the image pickup unit, and it is unnecessary to provide the zooming drive circuit in the image pickup unit when an optical system in which the image pickup system has a single focal range is used. If the image pickup system has a pan focusing operation, it is unnecessary to provide the focusing drive circuit in the image pickup unit.

Further, although, according to the first embodiment, the flat mirror 3 is used as a reflecting member, in place thereof, it is sufficient to use a prism having an incident refracting surface, an emitting refracting surface, and at least one reflecting surface for reflecting light which is incident from the incident refracting surface and for emitting the light from the emitting refracting surface.

If the reflecting surface of the reflecting member or refracting surface thereof has a curvature, the image pickup system can become smaller. In this case, the distortion of the image often causes by the reflecting member and therefore, preferably, for example, an image processing circuit for correcting the distortion of the image photographed by the image pickup device may be provided.

(Second Embodiment)

Figure 2:
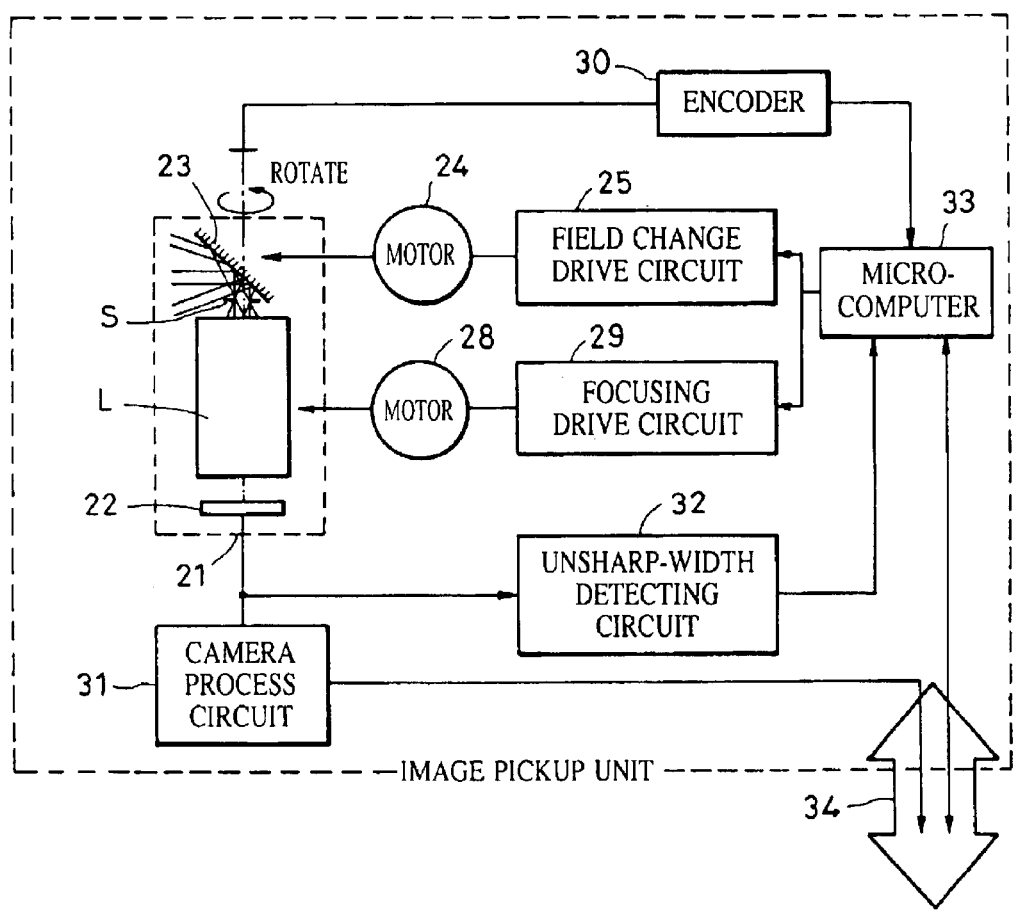
FIG. 2 is a block diagram showing a construction of an image pickup unit according to a second embodiment of the present invention.

FIG. 2 shows a schematic construction of an image pickup unit according to a second embodiment of the present invention. Referring to FIG. 2, reference numeral 21 denotes an image pickup system in which a field can change and L denotes an optical system which is included in the image pickup system 21.

Reference numeral 23 denotes a flat mirror (reflecting member) which is disposed at the position on the side of an object nearer than that of the optical system L. The flat mirror 23 is rotated while an optical axis of the optical system L is set as a central axis and, thereby, an image pickup range (field) of the an image pickup device (image pickup medium) 22 can be changed.

The image pickup device 22 (included in the image pickup system 21) photoelectrically converts an image of an object which is formed on an image pickup surface by the optical system L, and converts the image into a video signal.

As mentioned above, as compared with the case of rotating the whole image pickup system, the space necessary for the field change becomes smaller in the case of rotating only the flat mirror 23.

According to the present embodiment, a stop S is provided at the position which is the nearest to the object (the nearest to the flat mirror 23) in the optical system L. Therefore, the size of the flat mirror 23 can decrease, which will be described hereinlater.

Reference numeral 24 denotes a motor for rotating the flat mirror 23, and 25 denotes a field change drive circuit for driving the motor 24. Then, the motor 24 and the field change drive circuit 25 correspond to the reflecting member drive circuit. Reference numeral 30 denotes an encoder for detecting the rotary position of the flat mirror 23.

Reference numeral 28 denotes a motor for moving a focus lens (not shown) in the optical system L, and 29 denotes a focusing drive circuit for driving the motor 28. Then, the motor 28 and the focusing drive circuit 29 correspond to the focusing drive means.

Reference numeral 31 denotes a camera process circuit for converting the video signal from the image pickup device 22 into a standard television signal, and for outputting the signal from a video output terminal. The television signal which is outputted from the camera process circuit 11 is transmitted to an apparatus main body (e.g., a video telephone, and a portable terminal) via an interface 34 which is provided in the image pickup unit.

Reference numeral 32 denotes an unsharp-width detecting circuit (in-focus detecting means) for detecting a so-called unsharp width (width at an edge portion in an image of the object) of the object image in the video signal from the image pickup device 22, and for detecting an in-focus point by using the fact that, as the photographing state is nearer the in-focus state, the unsharp width of the object becomes smaller.

Reference numeral 33 denotes a microcomputer which controls the whole system and has an I/O port, an A/D converter, a ROM, and a RAM. Unsharp width information which is outputted by the unsharp-width detecting circuit 32 and peak-value information having a high frequency component from a band-pass filter (not shown) are inputted to the microcomputer 33.

The microcomputer 33 outputs a predetermined drive control signal to the focusing drive circuit 29 on the basis of the information so as to drive the focusing operation of the image pickup system 21, so that the unsharp width for one field of the video image becomes minimum and the peak value of the high frequency component becomes maximum.

Reference numeral 34 denotes the interface which transmits image data and/or a signal indicative of an operating state of the image pickup unit to the apparatus main body, and receives an operational signal for controlling the operation of the image pickup unit which is generated by the apparatus main body. The present image pickup unit is connected to the apparatus main body (e.g., the video telephone and the portable terminal having therein the image pickup unit) via the interface 34.

Next, the operation of the image pickup unit will be described. When the operational signal for the field change is transmitted to the microcomputer 33 in the image pickup unit via the interface 14 from a microcomputer (not shown) on the side of the apparatus main body (such as the video telephone and the portable terminal, etc. having therein the image pickup unit), the microcomputer 33 analyzes the operational signal and transmits a drive signal to the field change drive circuit 25. The field change drive circuit 25 drives the motor 24 on the basis of the drive signal transmitted, rotates the flat mirror 23, and changes the field which is photographed by the image pickup system 21.

The microcomputer 33 detects a position of the flat mirror 23 by way of the encoder 30, processes positional information obtained from the encoder 30, and transmits the processed information as field information which is outputted by the image pickup system 21 to the microcomputer on the side of the apparatus main body through the interface 34.

An image of the object to be photographed which is formed on the image pickup surface of the image pickup device 22 by the image pickup system 21 is photoelectrically converted into a video signal by the image pickup device 22, and is amplified by an preamplifier (not shown).

The amplified video signal is subjected to predetermined processes (such as a gamma correction, blanking process, process for adding a synchronous signal by the camera process circuit 31), and is converted into a standard television signal which is standardized, and is transmitted to the apparatus main body via the interface 34.

Figure 3:
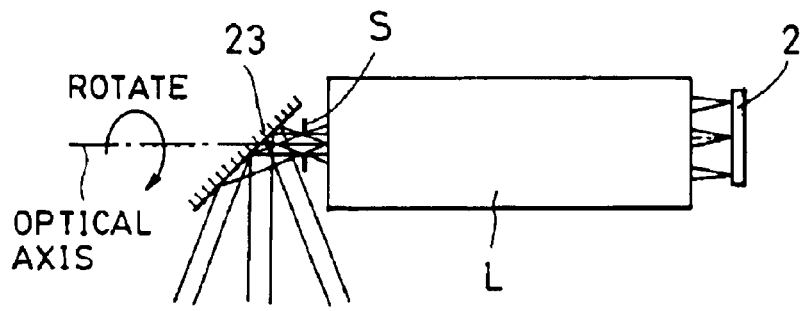
FIG. 3 is a diagram showing a construction of an image pickup system used for the image pickup unit according to the second embodiment.
Figure 4:
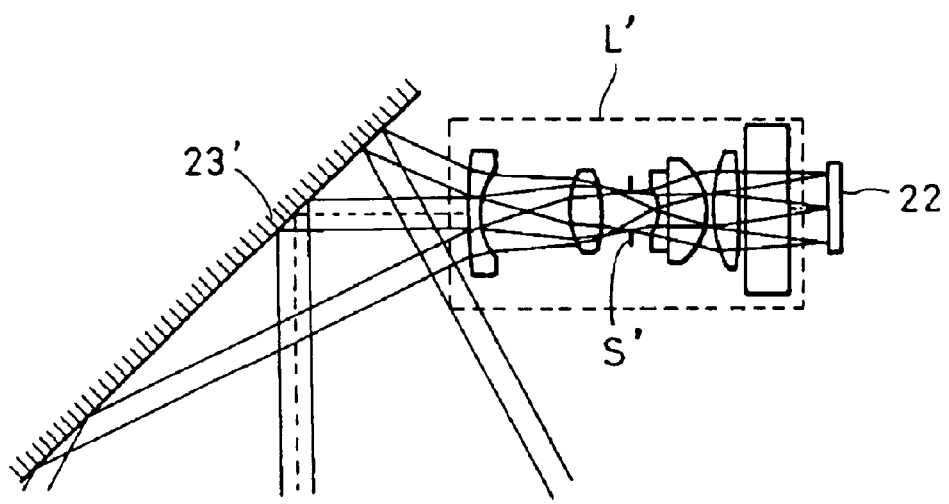
FIG. 4 is a constructional diagram of a general image pickup system in which a reflecting member is provided on the side of an object in an optical system and a stop is provided in the optical system.

FIG. 3 shows only the image pickup system 21 used for the image pickup unit according to the second embodiment. According to the second embodiment, when the stop S is disposed at the position which is the nearest to the object in the optical system L (what is called a front stop), the size of the flat mirror 23 does not depend on the internal optical system L but on the technical specification of the optical system L. Therefore, a specific construction of the inside of the optical system L is not shown here. FIG. 4 shows an optical system in which a stop S' is disposed between optical devices comprising the optical system, and a flat mirror 23' is provided at the position near the side of the object in the optical system.

An angle of view and a reduced scale in the optical system in FIG. 3 are almost the same as those in FIG. 4. As readily understood if the figures are compared, the size of the flat mirror 23 in FIG. 3 is much smaller than that of the flat mirror 23' in FIG. 4. When the optical system L' shown in FIG. 4 is used, the incident pupil exists at the position which is deep in the optical system L' and the optically effective diameter of a front lens becomes large and, in accordance therewith, the flat mirror 23' needs to be larger than the optical system L.

According to the second embodiment, the optical system L of the front stop is used, thereby the flat mirror 23 becomes small. Furthermore, only the small flat mirror 23 is rotated and, thus, the field changes. Consequently, it is possible to decrease the space for changing the field and make the image pickup unit more compact, as compared with not only the case of rotating the whole image pickup system but also the case of rotating the flat mirror 3 and the portion of the optical system at the position on the side of the object nearer than that of the flat mirror 3 (as shown in first embodiment).

Accordingly, the degrees of freedom of the apparatus main body can increase. Since the rotary portion in the image pickup system 21 is small, the power consumption becomes small and the power consumption of the whole apparatus can be reduced.

Besides, according to the second embodiment, the microcomputer 33 is provided in the image pickup unit and performs processes for operations of the image pickup system 21 via the drive circuits 25 and 29. In other words, the processing functions of the operations of the image pickup system 21 are collected together in the image pickup unit and, thereby, it is possible to provide the image pickup unit according to the second embodiment as a general unit to a variety of apparatuses. As compared with the case of designing an apparatus having an image pickup system therein, this makes it advantageous to lower the price of the image pickup unit and also the price of the apparatus. Further, as compared with the case in which the microcomputer disposed on side of the apparatus main body has the processing functions for the image pickup unit, the load of the microcomputer on the side of the apparatus main body can decreased.

Although, according to the second embodiment, the image data obtained by the image pickup device 22 is converted into the standard television signal when it is transmitted to the apparatus main body, the present invention is not limited to the case of using the method of transmitting the image data.

Although, according to the second embodiment, the case in which the unsharp-width detecting circuit 32 is provided and the unsharp width of the image of the object is detected from among the video signal from the image pickup device 22, and the focusing operation is executed so that the unsharp width becomes minimum as described, a focusing method other than the foregoing may be adopted in the present invention. For example, a distance measuring unit for measuring a distance to the object may be provided and, in accordance with the output of the distance measuring unit, the microcomputer 33 may transmit a drive signal to the focus driving circuit and a focus lens may be moved, thereby performing the focusing.

Although, according to the second embodiment, the case in which the focus lens is driven and, thereby, the focusing is performed as described, in place thereof, the image pickup device 22 may be moved. Further, a light measuring unit for measuring the brightness of the object may be provided, and exposure correction may be controlled by driving the stop S by the microcomputer 33 on the basis of information obtained by the light measuring unit, etc.

Although, according to the second embodiment, the case in which the focusing drive circuit 29 is included as described, the present invention does not need the focusing drive circuit 29. That is, according to the present invention, the processing functions of the image pickup system may be collected together in the image pickup unit. If the image pickup system has a pan focusing operation, it is unnecessary to provide the focusing drive circuit in the image pickup unit.

Further, although, according to the second embodiment, the flat mirror 23 is used as a reflecting member, in place thereof, it is sufficient to use a prism having an incident refracting surface, an emitting refracting surface, and at least one reflecting surface for reflecting light which is incident from the incident refracting surface and emitting the light from the emitting refracting surface.

If the reflecting surface of the reflecting member or refracting surface thereof has a curvature, the image pickup system can become smaller. In this case, the distortion of the image causes in the reflecting member in many cases and therefore, preferably, for example, an image processing circuit for correcting the distortion of the image photographed by the image pickup device may be provided.

According to the second embodiment, although the case in which the field changes by rotating the flat mirror 23 while the optical axis is set as a central axis is described, the flat mirror may be rotated by setting an axis other than the optical axis as a central axis. The reflecting member may be moved in parallel and the field may be changed.

Although a third embodiment of the second invention will be described, optical components and common items of optical devices used in the third embodiment and a fourth embodiment will be described before the description of the third embodiment.

Figure 10:
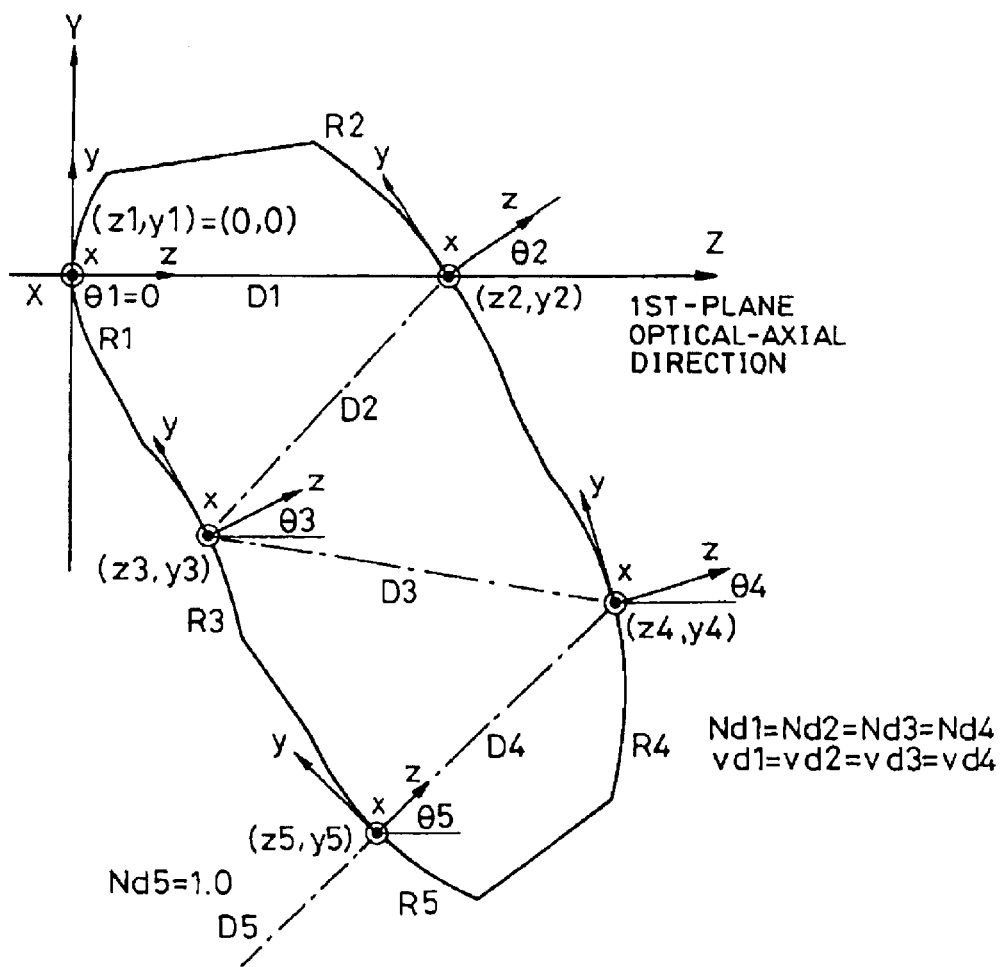
FIG. 10 is a model diagram of an optical device used for the third and fourth embodiments.

FIG. 10 is a diagram for illustrating a coordinate system which defines constructional data of the optical device used for the third and fourth embodiments. Herein, it is assumed that an i-th plane along one ray of light which advances from the side of an object to an image surface (shown by alternate long and short dash lines in FIG. 10 and referred to as a reference-axis ray of light) is called the i-th plane.

According to the optical device shown in FIG. 10, a first plane R1 denotes a refracting surface, a second plane R2 denotes a reflecting surface which tilts to the first plane R1, a third plane R3 and a fourth plane R4 are reflecting surfaces which shift and tilt to the front planes thereof, respectively, and a fifth plane is a refracting surface which shifts and tilts to the fourth plane R4.

The first to fifth planes are constructed on the surface of one optical device which is made of a medium such as glass or resin.

Therefore, referring to FIG. 10, the medium from the surface of the object (not shown) to the first plane R1 is air, the medium from the first plane R1 to the fifth plane R5 is any desired common-medium, and the medium from the fifth plane R5 to a sixth plane R6 (not shown) is air.

Since this optical device is an off-axial optical system, the planes comprising an optical system have no common optical axis. In the description, an absolute coordinate system in which the center of the first plane R1 is called as an origin is set.

A path of a ray of light (reference-axis ray of light) which passes through the origin and the center of a final image-forming surface is defined as a reference axis of the optical axis. Further, the reference axis has a direction. The direction indicates that the reference-axis ray of light advances when an image is formed.

To determine the axis which becomes a reference of the optical system, it is sufficient to adopt an axis which is advantageous for easily grasping the whole abbreviations or the shapes of the planes comprising the optical system on the design of the optical system. However, generally, a path of ray of light which passes through the center of the surface of the image or the surface of the object and any one of the centers of the stop, the incident pupil, the emitting pupil, the first surface of the optical system, or the center of the final surface is set as a reference axis which becomes the reference of the optical system.

Herein, a path (reference-axis ray of light) in which a ray of light passing through the central point of the first plane and reaching the center of the final image-forming surface is refracted and reflected by the refracting surfaces and the reflecting surface, is set as the reference axis. The order of the surfaces is set in the order in which the reference-axis ray of light is refracted and reflected. Therefore, the reference axis finally reaches the center of the surface of the image while changing direction in accordance with the law of the refraction or the reflection in the set order of the surfaces.

According to the model of the optical device, all of the tilting surfaces fundamentally tilt in the same direction. Then, the axes of the absolute coordinate system are determined as follows.

Z-axis: straight line which passes through the origin and the center of the surface of the object (it is assumed that the direction from the surface of the object to the first surface R1 is set as positive)

Y-axis: straight line which passes through the origin and forms an angle of 90° in the counterclockwise direction to the Z-axis in the tilting surface (in the sheet of FIG. 10)

X-axis: straight line which passes through the origin and is vertical to the Z- and Y-axes (straight line which is vertical to the sheet of FIG. 10)

When the shape of the surface of the i-th plane which comprises the optical system is simply expressed, it is easier to understand the shape of the surface by setting a local coordinate system in that a point at which the reference axis crosses the i-th plane is set as an origin and by expressing the shape of the plane on the local coordinate system (as compared with expressing the shape of the plane by an absolute coordinate system). Therefore, the shape of the i-th plane is expressed by the local coordinate system.

A tilting angle in the YZ-plane of the i-th plane is expressed by an angle $\theta i$ (unit: °) while the counterclockwise direction to Z-axis of the absolute coordinate system is set as positive. The origin of the local coordinate system of the planes exists on the YZ-plane in FIG. 10. No eccentricity exists on the XZ-plane and the XY-plane.

Further, y- and z-axes at local coordinates (x, y, z) of the i-th plane are tilted by the angle $\theta i$ in the YZ-surface to the absolute coordinate system (X, Y, Z), and the specific setting is as follows.

z-axis: straight line which passes through the origin of the local coordinate system and forms the angle $\theta i$ in the counterclockwise direction in the YZ-plane to the Z-direction of the absolute coordinate system y-axis: straight line which passes through the origin of the local coordinate system and forms an angle of 90° in the counterclockwise direction in the YZ-plane to the z-direction x-axis: straight line which passes through the origin of the local coordinate system and is vertical to the YZ-plane Di denotes a scalar amount indicative of an interval between the origins of the local coordinates of the i-th plane and an (i+1)-th plane, and Ndi and vdi denote an index of refraction and an Abbe number of the medium between the i-th plane and an (i+1)-th plane.

If a plurality of optical devices are moved and the whole focusing distance is changed (in other words, zoomed) as will be shown in the fourth embodiment, cross-sectional views and value data are shown at three positions of a wide angle end (W), a telephoto end (T), and the medium position (M).

At the origin (Yi, Zi) of the local coordinate indicative of the positions of the planes, the values change at the zooming positions when the optical device moves in the YZ-plane in the model of the optical device in FIG. 10. The optical device which moves for zooming moves only in the Z-axial direction. Therefore, the optical system indicates a coordinate value Zi as Zi(W), Zi(M), and Zi(T) in the order of the wide angle end, medium position, and telephoto end.

The coordinate values of the planes indicate values at the wide angle end, and those at the medium position and the telephoto end are described by differences between (i) the wide angle end and the medium position and (ii) between the wide angle end and the telephoto end. Specifically, if moving amounts at the medium position (M) and the telephoto end (T) to the wide angel end (W) are called "a" and "b", respectively, coordinate values are expressed by the following expressions.

$$Zi(M)=Zi(W)+a$$

$$Zi(T)=Zi(W)+b$$

It is assumed that the signs of "a" and "b" are set as positive and negative when the planes move in the positive direction of the Z-axis and in the negative direction of the Z-axis, respectively. The plane interval Di which changes in accordance with the movement denotes a variable, and values at the zooming positions are shown as data of the optical system, which will be described hereinlater.

The model of the optical device has a sphere and an asphere which has rotational asymmetry. The spheric portion in the planes is described by a curvature radius Ri as a spheric form. The signs of the curvature radius Ri are set as the negative and the positive when the center of the curvature exists on the side of the first plane along the reference axis (alternate long and short dash lines in FIG. 10) which advances from the first plane to the surface of the image and on the side of the image-formed surface, respectively.

Herein, the sphere has a form expressed by the following expression:

$$z = \frac{(x^2+y^2)/Ri}{1+\{1-(x^2+y^2)/Ri^2\}^{1/2}} \quad \text{[Expression 1]}$$

The optical device has at least one asphere which has rotational asymmetry and the form is expressed by the following expression:

$$z=C02y^2+C20x^2+C03y^3+C21x^2y+C04y^4+C22x^2y^2+C40x^4+C05y^5+C23x^2y^3+C41x^4y+C06y^6+C24x^2y^4+C42x^4y^2+C60x^6$$

The curved surface expression relates to only items of an even degree concerning x. Therefore, the curved surface which is specified by the curved surface expression has a form which has plane symmetry when the yz-surface is a symmetric plane. Further, in the case in which the following conditions are satisfied, the curved surface represents a form which has plane symmetry when the xz-surface is a symmetric plane.

$$C03=C21=C05=C23=C41=0$$

If the following expressions are satisfied, a form which has rotational symmetry is shown below.

$$C02=C20, C04=C40=C22/2, C06=C60=C24/3=C42/3$$

If the above-mentioned expressions are not satisfied, the form has rotational asymmetry.

A horizontal half angle of view uY denotes a half value of a maximum angle of view of beams which are made incident to the first plane R1 in the YZ-plane in FIG. 10, and a vertical half angle of view uX denotes a half value of a maximum angle of view of beams which are made incident to the first plane R1 in the XZ-plane in FIG. 10. A diameter of the stop is indicated as a value of a stop diameter. The value of the stop diameter is related to the brightness of the optical system.

The range of an effective image on the surface of the image is indicated as an image size. The image size is represented by a rectangular area in which the size of y-direction of the local coordinate is the size in the horizontal direction and the size of x-direction thereon is the size in the vertical direction.

(Third Embodiment)

Figure 5:
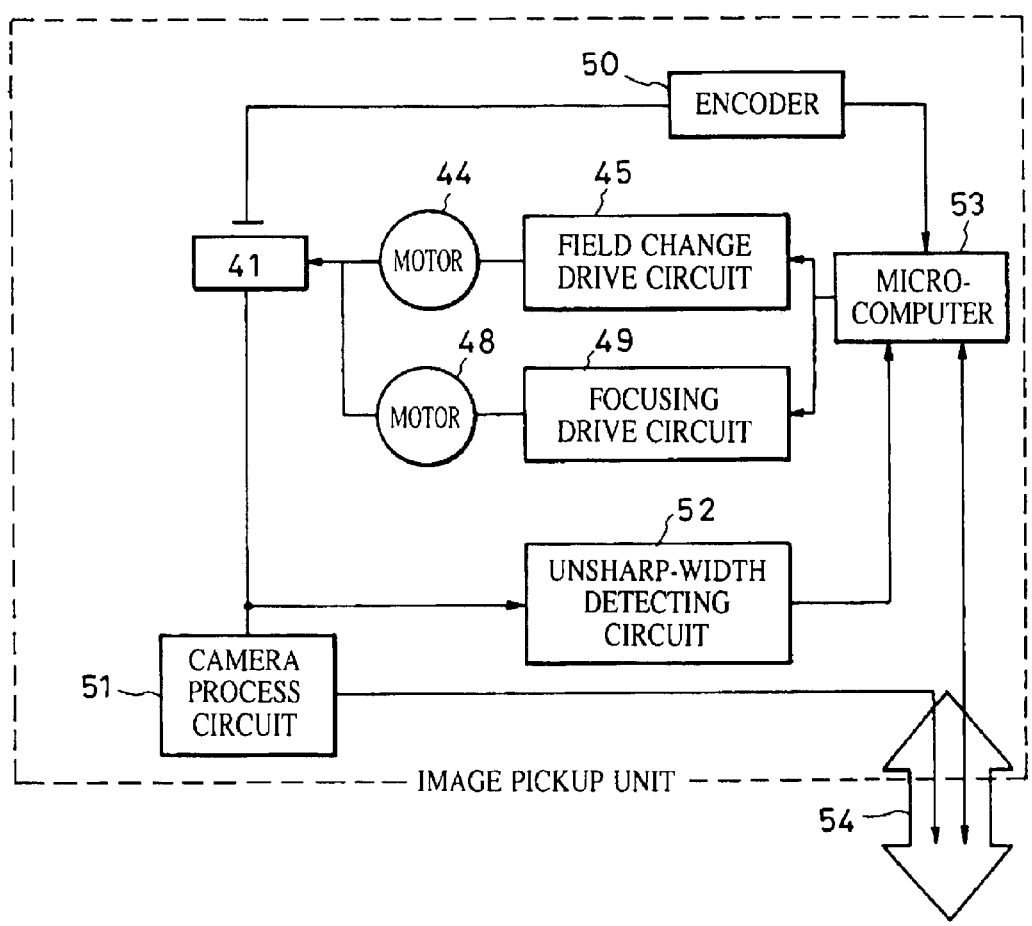
FIG. 5 is a block diagram showing a construction of an image pickup unit according to a third embodiment of the present invention.
Figure 6:
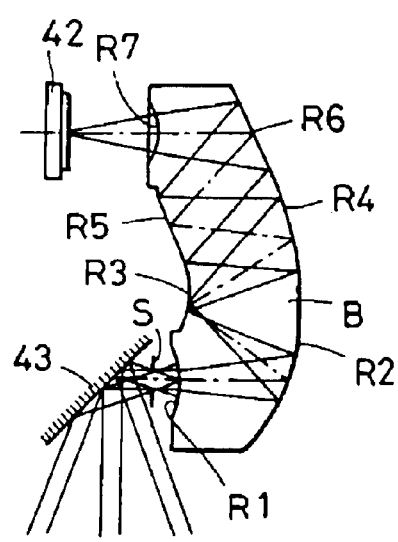
FIG. 6 is a diagram showing a construction of an image pickup system used for the image pickup unit according to the third embodiment.

FIG. 5 shows a schematic construction of an image pickup unit according to the third embodiment of the present invention. FIG. 6 shows a construction of an image pickup system 41 used for the image pickup unit according to the present embodiment, in which the field can change.

Referring to FIG. 6, reference character B denotes an optical device which comprises an optical system in the image pickup system 41. The optical device B is constructed by integrally forming two refracting surfaces having curvatures (an incident refracting surface: a first plane R1 and an emitting refracting surface: a seventh surface R7) and five reflecting surfaces having curvatures (a second surface R2 to a sixth surface R6) on the surface of a transparent object.

Specifically, the optical device B has a concave refracting surface (incident refracting surface), five reflecting surfaces of, a concave mirror, a convex mirror, a concave mirror, a convex mirror, and a convex mirror, and a convex refracting surface (emitting refracting surface). Light which is incident to the incident refracting surface repeats the reflection at the plurality of reflecting surfaces and is emitted from the emitting refracting surface.

The optical device B has a predetermined optical performance which is caused by optical functions due to the five reflecting surfaces having both the refracting surfaces and the curvatures, and functions similar to a lens unit through which an image is formed as a whole. Incidentally, the direction of a reference axis of light which is incident to the optical device B of the present embodiment (which will be described hereinafter) is almost in parallel to the direction of a reference axis of light which is emitted from the optical device B and opposite thereto.

Reference numeral 43 denotes a flat mirror (reflecting member) which is disposed at the position on the side of an object nearer than that of the optical device B. According to the present embodiment, the flat mirror 43 is rotated while an incident reference-axis of the optical device B is set as central axis and, thereby, an image pickup range (field) can be changed by an image pickup device (image pickup medium) 42. A stop S as well as the optical device B constructing the optical system is disposed at the position on the side (near the flat mirror 43) which is the nearest to the object in the optical system.

The image pickup device 42 included in the image pickup system 41 photoelectrically converts an image of the object which is formed on an image pickup surface by the optical system and converts the image into a video signal. According to the present embodiment, the image pickup device 42 is moved in the optical axis, thereby performing the focusing.

Referring to FIG. 5, reference numeral 44 denotes a motor for rotating the flat mirror 43, and 45 denotes a field change drive circuit for driving the motor 44. Then, the motor 44 and the field change drive circuit 45 correspond to the reflecting member drive circuit in the summary of the invention. Reference numeral 50 denotes an encoder for detecting a rotary position of the flat mirror 43.

Reference numeral 48 denotes a motor for moving the image pickup device 42 in the optical axis, and 49 denotes a focusing drive circuit for driving the motor 48. Then, the motor 48 and the focusing drive circuit 49 correspond to the focusing function in the summary of the invention.

Reference numeral 51 denotes a camera process circuit for converting a video signal from the image pickup device 42 into a standard television signal and outputting the signal from a video output terminal. The television signal which is outputted from the camera process circuit 51 is transmitted to an apparatus main body e.g., a video telephone, and a portable terminal via an interface 54 which is provided in the image pickup unit.

Reference numeral 52 denotes an unsharp-width detecting circuit (in-focus detecting means) for detecting a so-called unsharp width (width at an edge portion in an image of the object) of the object image in the video signal from the image pickup device 42 and, that is, for detecting an in-focus point by using the nature that as the photographing state is nearer the in-focus state, the unsharp width of the object becomes smaller.

Reference numeral 53 denotes a microcomputer which controls the whole system and has an I/O port, an A/D converter, a ROM, and a RAM. Unsharp width information (which is outputted by the unsharp-width detecting circuit 52) and peak-value information having a high frequency component from a band-pass filter (not shown) are inputted to the microcomputer 53.

The microcomputer 53 outputs a predetermined drive control signal to the focusing drive circuit 49 on the basis of the information so as to drive the focusing operation of the image pickup system 41 (image pickup device 42), so that an unsharp width for one field of the video image becomes minimum and the peak value of the high frequency component becomes maximum.

Reference numeral 54 denotes the interface which transmits image data or a signal indicative of an operating state of the image pickup unit to the apparatus main body and receives the operational signal for controlling the operation of the image pickup unit which is generated by the apparatus main body. The present image pickup unit is connected to the apparatus main body (such as the video telephone and the portable terminal) via the interface 54.

Next, the operation of the image pickup unit will be described. When an operational signal for the field change is transmitted to the microcomputer 53 in the image pickup unit via the interface 54 from a microcomputer (not shown) on the side of the apparatus main body (such as the video telephone and the portable terminal, having therein the image pickup unit), the microcomputer 53 analyzes the operational signal and transmits a drive signal to the field change drive circuit 45. The field change drive circuit 45 drives the motor 44 on the basis of the drive signal transmitted, rotates the flat mirror 43, and changes the field which is photographed by the image pickup system 41.

The microcomputer 53 detects a position of the flat mirror 43 by way of the encoder 50, processes positional information obtained from the encoder 50, and transmits the processed information as field information which is outputted by the image pickup system 41 to the microcomputer on the side of the apparatus main body through the interface 54.

An image of the object to be photographed which is formed on the image pickup surface of the image pickup device 42 by the image pickup system 41 is photoelectrically converted into a video signal by the image pickup device 42 and is amplified by a preamplifier (not shown).

The amplified video signal is subjected to predetermined processes (such as a gamma correction, blanking process, a process for adding a synchronous signal) by the camera process circuit 51, and is converted into a standard television signal, and is transmitted to the apparatus main body via the interface 54.

According to the third embodiment, similar to the second embodiment, the optical system of the front stop is used, and the flat mirror 43 becomes small. Further, only the small flat mirror 43 is rotated and, thus, the field changes. Consequently, it is possible to decrease a space for changing the field and make the image pickup unit more compact in this case, as compared with not only the case of rotating the whole image pickup system but also the case of rotating the flat mirror 3 and the portion constructing the optical system on the side of the object nearer than that of the flat mirror 3, as shown in first embodiment.

Accordingly, the degrees of freedom of the apparatus main body can increase. Since the rotary portion in the image pickup system 41 is small, power consumption becomes small and the power consumption of the whole apparatus can be reduced.

Besides, according to the third embodiment, the microcomputer 53 is provided in the image pickup unit and performs processes for operations of the image pickup system 41 via the drive circuits 45 and 49. In other words, the processing functions of the operations of the image pickup system 41 are collected together in the image pickup unit and, therefore, it is possible to provide the image pickup unit according to the present embodiment as a general unit to a variety of apparatuses. As compared with the case of designing an apparatus having the image pickup system therein, this makes it advantageous to lower the price of the image pickup unit and also the price of the apparatus. Further, as compared with the case in which the microcomputer on side of the apparatus main body has the processing functions for the image pickup unit, the load of the microcomputer on the side of the apparatus main body can decreased.

Although, according to the third embodiment, the image data obtained by the image pickup device 42 is converted into the standard television signal when it is transmitted to the apparatus main body, the present invention is not limited to the case of using that method of transmitting the image data.

Although, according to the third embodiment, the case in which the unsharp-width detecting circuit 52 is provided and the unsharp width of the image of the object is detected from among the video signal from the image pickup device 42 and the focusing operation is executed so that the unsharp width becomes minimum is described, a focusing method other than the foregoing may be adopted to the present invention. For example, a distance measuring unit for measuring a distance to the object may be provided and, in accordance with the output of the distance measuring unit, the microcomputer 53 may transmit a drive signal to the focus driving circuit and a focus lens may be moved, thereby performing the focusing.

Although, according to the third embodiment, the case in which the image pickup device 42 is moved and, thereby, the focusing is performed is described, the focusing may be moved by another method. Further, a light measuring unit for measuring the brightness of the object may be provided and exposure correction may be controlled by driving the stop S by the microcomputer 53 on the basis of information obtained by the light measuring unit.

Although, according to the third embodiment, the case in which the focusing drive circuit 49 is included is described, the present invention does not need the focusing drive circuit 49. That is, according to the present invention, the processing functions of the image pickup system may be collected together in the image pickup unit. If the image pickup system has a pan focusing operation, it is unnecessary to provide the focusing drive circuit in the image pickup unit.

Further, although, according to the third embodiment, the flat mirror 43 is used as a reflecting member, in place thereof, it is sufficient to use a prism having an incident refracting surface, an emitting refracting surface, and at least one reflecting surface for reflecting light which is incident from the incident refracting surface and emitting the light from the emitting refracting surface.

If the reflecting surface of the reflecting member or refracting surface thereof has a curvature, the image pickup system can become smaller. In this case, preferably, an image processing circuit for correcting the distortion of the image photographed by the image pickup device (which is caused by the reflecting member) may be provided in the camera process circuit 31.

According to the third embodiment, although the case in which the field is changed by rotating the flat mirror 43 while the optical axis is set as a central axis is described, the flat mirror 43 may be rotated by setting an axis other than the optical axis as a central axis. The reflecting member may be moved in parallel and the field may be changed.

Furthermore, although according to the optical device B of the third embodiment, the case in which the direction of the incident reference axis is almost parallel to the direction of the emitting reference axis and opposite thereto is described, it is possible to use various optical devices which have incident reference axes whose directions are different from those of the emitting reference axes as disclosed in Japanese Patent Laid-Open Nos. 8-292371, 8-292372, and 9-222561. As mentioned above, it is possible to freely select the motion of the reflecting member for the image pickup medium and to make the whole unit compact.

According to the third embodiment, although the case in which predetermined optical performance is obtained by one image-forming optical device and the optical system functions as a lens unit for forming a real image as a whole is described, the optical system may be constructed by a plurality of optical devices which include at least one of the above optical devices.

Hollow-type optical devices, all of which are constructed by reflecting surfaces, may be used as disclosed in Japanese Patent Laid-Open Nos. 8-292371 and 8-292372.

Moreover, in the case in which a plurality of optical devices are used, the zooming may be performed by changing the relative positions of at least two optical devices.

(Fourth Embodiment)

Figure 7:
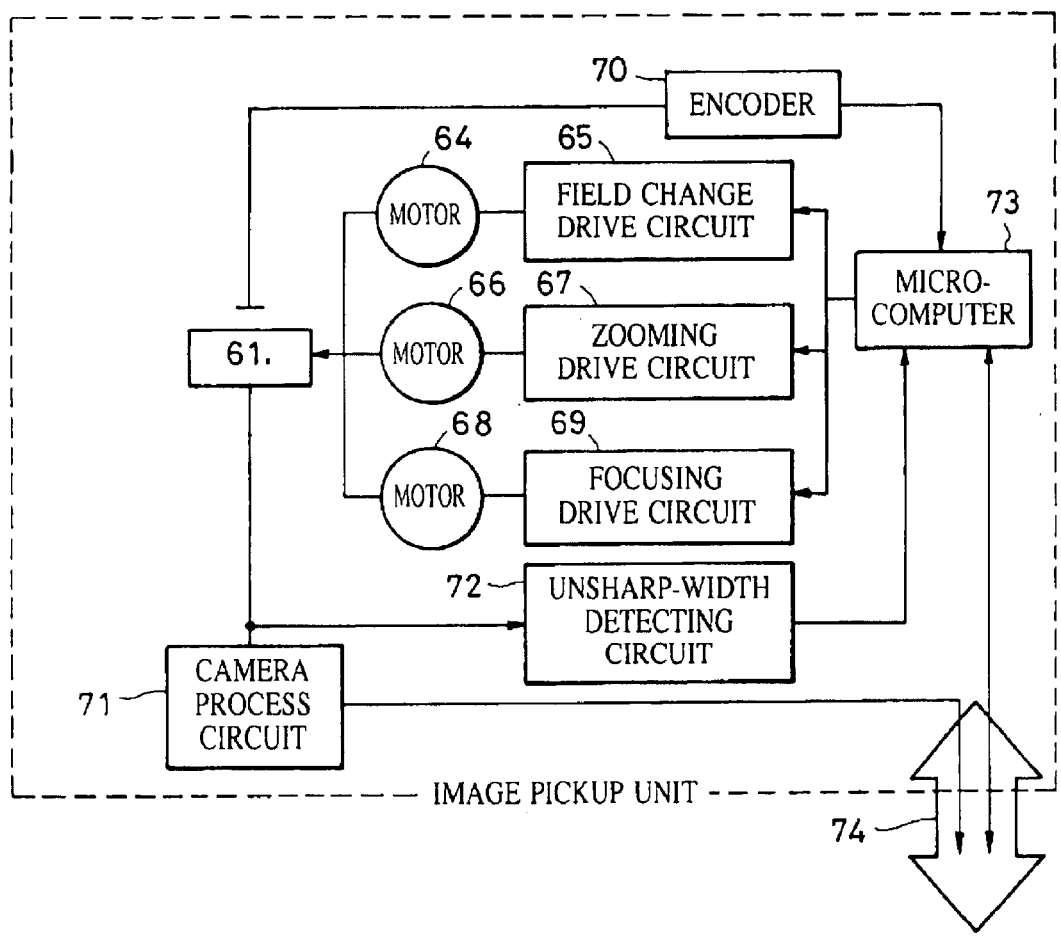
FIG. 7 is a block diagram of a construction of an image pickup unit according to a fourth embodiment of the present invention.
Figure 8:
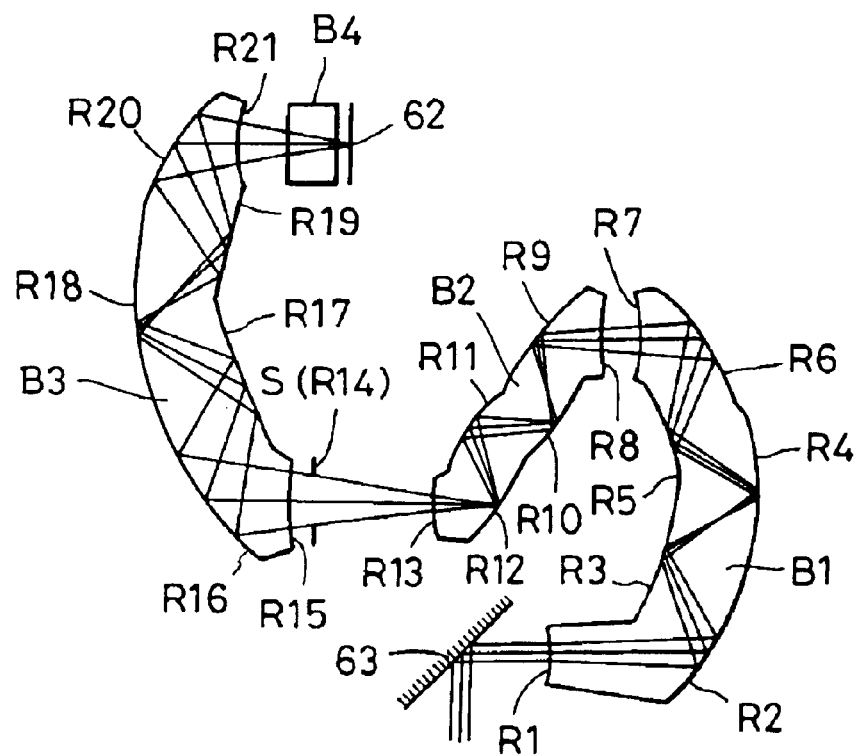
FIG. 8 is a diagram showing a construction of an image pickup system used for the image pickup unit according to the fourth embodiment.

FIG. 7 illustrates a schematic construction of an image pickup unit according to the fourth embodiment of the present invention. FIG. 8 illustrates a construction of an image pickup system 61 used for the image pickup unit according to the fourth embodiment, in which the field can change.

Referring to FIG. 8, reference characters B1 to B3 denote optical devices which comprises an optical system in the image pickup system 61. The optical devices B1 to B3 are constructed by integrally forming two refracting surfaces having curvatures (incident refracting surfaces: a first plane R1, an eighth plane RB, and a fifteenth plane R15, and emitting refracting surfaces: a seventh plane R7, a thirteenth plane R13, and a twenty-first plane R21) and a plurality of reflecting surfaces having curvatures (a second plane R2 to a sixth plane R6, a ninth plane R9 to a twelfth plane R12, and a sixteen plane R16 to a twentieth plane R20) on the surface of a transparent object. Light which is incident to the incident refracting surfaces repeats the reflection at the plurality of reflecting surfaces and is emitted from the emitting refracting surface. Reference numeral 62 denotes an image pickup device (image pickup medium) comprising a final surface of an image. Incidentally, the directions of reference axes of light which are incident to the optical devices B1 to B3 of the present embodiment (which will be described hereinafter) are almost parallel to the directions of reference axes of light which are emitted from the optical devices B1 to B3 and opposite thereto.

According to the fourth embodiment, a three-group zoom lens whose zooming ratio is three is comprises by the three optical devices B1 to B3. B4 denotes an optical correcting plane comprising a parallel plane and comprises by a low-pass filter and an infrared cut filter, etc. which are made of crystal.

Reference numeral 63 denotes a flat mirror (reflecting member) which is disposed on the side of an object nearer than that of the optical device B1. According to the fourth embodiment, the flat mirror 63 is rotated while an incident reference-axis of the optical device B1 is set as a central axis and, thereby, an image pickup range (field) of the image pickup device (image pickup medium) 62 can be changed. A stop S (as well as the optical devices B1 to B3 comprising the optical system) is disposed between the optical devices B2 and B3 in the optical system.

Herein, specific constructional data of the optical system is shown.

| | Wide angle end, | Medium position, | Telephoto end |
|---|---|---|---|
| Horizontal half angle of view | 26.3 | 13.9 | 9.3 |
| Vertical half angle of view | 20.3 | 10.5 | 7.0 |
| Stop diameter | 1.82 | 1.82 | 1.82 |
| Image size (Horizontal × Vertical) | 3.554 mm × 2.666 mm | | |

| i | Yi | Zi (W) | θi | Di | Ndi | νdi | |
|---|---|---|---|---|---|---|---|
| First optical device | | | | | | | |
| 1 | 0.00 | 1.00 | 0.00 | 12.80 | 1.57250 | 57.76 | Refracting surface |

-continued

| | | | | | | | |
|---|---|---|---|---|---|---|---|
| 2 | 0.00 | 13.80 | 32.91 | 9.00 | 1.57250 | 57.76 | Reflecting surface |
| 3 | −8.21 | 10.11 | 16.95 | 9.00 | 1.57250 | 57.76 | Reflecting surface |
| 4 | −12.97 | 17.75 | 0.14 | 8.50 | 1.57250 | 57.76 | Reflecting surface |
| 5 | −17.50 | 10.56 | −19.56 | 8.50 | 1.57250 | 57.76 | Reflecting surface |
| 6 | −25.55 | 13.28 | −35.53 | 5.20 | 1.57250 | 57.76 | Reflecting surface |
| 7 | −25.58 | 8.08 | 0.28 | variable | 1 | | Refracting surface |
| Second optical device | | | | | | | |
| 8 | −25.59 | 5.08 | 0.28 | 5.50 | 1.57250 | 57.76 | Refracting surface |
| 9 | −25.62 | −0.42 | 38.01 | 7.20 | 1.57250 | 57.76 | Reflecting surface |
| 10 | −18.64 | 1.35 | 37.25 | 7.20 | 1.57250 | 57.76 | Reflecting surface |
| 11 | −18.48 | −5.84 | 33.44 | 6.80 | 1.57250 | 57.76 | Reflecting surface |
| 12 | −12.17 | −3.31 | 34.24 | 5.50 | 1.57250 | 57.76 | Reflecting surface |
| 13 | −12.21 | −8.81 | 0.37 | variable | 1 | | Refracting surface |
| Stop | | | | | | | |
| 14 | −12.27 | −18.32 | 0.37 | variable | 1 | | Stop |
| Third optical device | | | | | | | |
| 15 | −12.28 | −20.32 | 0.37 | 6.60 | 1.57250 | 57.76 | Refracting surface |
| 16 | −12.33 | −26.92 | −35.35 | 9.60 | 1.57250 | 57.76 | Reflecting surface |
| 17 | −21.41 | −23.80 | −20.80 | 10.00 | 1.57250 | 57.76 | Reflecting surface |
| 18 | −26.33 | −32.51 | −6.23 | 9.50 | 1.57250 | 57.76 | Reflecting surface |
| 19 | −32.68 | −25.44 | 11.22 | 10.00 | 1.57250 | 57.76 | Reflecting surface |
| 20 | −41.70 | −29.77 | 32.17 | 5.00 | 1.57250 | 57.76 | Reflecting surface |
| 21 | −41.70 | −24.77 | −0.04 | variable | 1 | | Refracting surface |
| Optical correcting plate | | | | | | | |
| 22 | −41.69 | −20.72 | 0.00 | 4.00 | 1.51633 | 64.15 | Refracting surface |
| 23 | −41.69 | −16.72 | 0.00 | 1.00 | 1 | | Refracting surface |
| Surface of image | | | | | | | |
| | −41.69 | −15.72 | −0.00 | | 1 | | Surface of image |

| | Wide angle end | Intermediate position | Telephoto end |
|---|---|---|---|
| D7 | 3.00 | 6.82 | 8.75 |
| D13 | 9.51 | 5.38 | 2.71 |
| D14 | 2.00 | 2.57 | 2.00 |
| D21 | 4.05 | 4.31 | 3.00 |
| planes D1 to D7 | | $Zi(M) = Zi(W) - 0.00$ | $Zi(T) = Zi(W) - 0.00$ |
| planes D8 to D13 | | $Zi(M) = Zi(W) - 3.82$ | $Zi(T) = Zi(W) - 5.75$ |
| plane D14 | | $Zi(M) = Zi(W) + 0.31$ | $Zi(T) = Zi(W) + 1.05$ |
| planes D15 to D21 | | $Zi(M) = Zi(W) - 0.26$ | $Zi(T) = Zi(W) + 1.05$ |
| plane D22 | | $Zi(M) = Zi(W)$ | $Zi(T) = Zi(W)$ |

Spheric form

| plane R1 | $r1 = -10.000$ |
|---|---|
| plane R7 | $r7 = -15.561$ |
| plane R8 | $r8 = 34.119$ |
| plane R13 | $r13 = 8.858$ |
| plane R15 | $r15 = 26.889$ |
| plane R21 | $r21 = 9.484$ |

Aspheric form

| plane R2 | $C02 = -2.12342_e\text{-}02$ | $C20 = -4.20269_e\text{-}02$ |
|---|---|---|
| | $C03 = 1.81374_e\text{-}04$ | $C21 = 9.17118_e\text{-}05$ |
| | $C04 = -1.85211_e\text{-}05$ | $C22 = -2.40729_e\text{-}05$ |
| | | $C40 = -6.48161_e\text{-}05$ |
| plane R3 | $C02 = -7.61864_e\text{-}03$ | $C20 = -9.02818_e\text{-}02$ |
| | $C03 = 1.92614_e\text{-}04$ | $C21 = -1.72415_e\text{-}03$ |
| | $C04 = -2.70968_e\text{-}04$ | $C22 = -1.24810_e\text{-}03$ |
| | | $C40 = 1.09034_e\text{-}02$ |
| plane R4 | $C02 = -2.43274_e\text{-}02$ | $C20 = -4.36675_e\text{-}02$ |
| | $C03 = 6.68845_e\text{-}05$ | $C21 = -5.93107_e\text{-}04$ |
| | $C04 = -6.16416_e\text{-}05$ | $C22 = -1.24891_e\text{-}04$ |
| | | $C40 = -1.39581_e\text{-}04$ |
| plane R5 | $C02 = -1.84925_e\text{-}02$ | $C20 = -8.18249_e\text{-}03$ |
| | $C03 = -1.08792_e\text{-}04$ | $C21 = 1.60755_e\text{-}03$ |
| | $C04 = -1.79570_e\text{-}04$ | $C22 = -1.21026_e\text{-}03$ |
| | | $C40 = -4.14091_e\text{-}04$ |
| plane R6 | $C02 = -2.65562_e\text{-}02$ | $C20 = -2.11329_e\text{-}02$ |
| | $C03 = 7.38808_e\text{-}05$ | $C21 = -2.82041_e\text{-}04$ |
| | $C04 = -3.46320_e\text{-}05$ | $C22 = -2.49266_e\text{-}04$ |
| | | $C40 = 2.48610_e\text{-}05$ |
| plane R9 | $C02 = 2.43116_e\text{-}02$ | $C20 = 3.12150_e\text{-}02$ |
| | $C03 = 8.60449_e\text{-}04$ | $C21 = -1.74279_e\text{-}03$ |
| | $C04 = 6.03223_e\text{-}05$ | $C22 = -1.46771_e\text{-}04$ |
| | | $C40 = 7.87587_e\text{-}05$ |
| plane R10 | $C02 = -2.50756_e\text{-}02$ | $C20 = 8.47992_e\text{-}04$ |
| | $C03 = -9.16289_e\text{-}06$ | $C21 = -6.12416_e\text{-}03$ |
| | $C04 = -6.54263_e\text{-}05$ | $C22 = -1.77537_e\text{-}04$ |
| | | $C40 = 2.46426_e\text{-}04$ |
| plane R11 | $C02 = 4.04553_e\text{-}02$ | $C20 = 4.59632_e\text{-}02$ |
| | $C03 = -1.85442_e\text{-}03$ | $C21 = 2.67661_e\text{-}03$ |
| | $C04 = 4.88193_e\text{-}04$ | $C22 = 1.23645_e\text{-}03$ |
| | | $C40 = -6.35068_e\text{-}05$ |
| plane R12 | $C02 = -2.90408_e\text{-}02$ | $C20 = -8.00000_e\text{-}02$ |
| | $C03 = -6.81882_e\text{-}05$ | $C21 = 1.16013_e\text{-}02$ |
| | $C04 = 3.36006_e\text{-}04$ | $C22 = -2.43191_e\text{-}03$ |
| | | $C40 = 8.31150_e\text{-}04$ |
| plane R16 | $C02 = 1.87672_e\text{-}02$ | $C20 = 5.27232_e\text{-}02$ |
| | $C03 = 1.12373_e\text{-}04$ | $C21 = -1.64190_e\text{-}03$ |
| | $C04 = 1.89013_e\text{-}05$ | $C22 = 5.46061_e\text{-}05$ |
| | | $C40 = 2.11500_e\text{-}04$ |
| plane R17 | $C02 = 5.63146_e\text{-}03$ | $C20 = -4.66337_e\text{-}02$ |
| | $C03 = 9.10393_e\text{-}04$ | $C21 = -1.82539_e\text{-}03$ |
| | $C04 = 3.21114_e\text{-}05$ | $C22 = -7.82380_e\text{-}04$ |
| | | $C40 = 4.32072_e\text{-}04$ |
| plane R18 | $C02 = 2.34915_e\text{-}02$ | $C20 = 2.96401_e\text{-}02$ |
| | $C03 = -2.98888_e\text{-}04$ | $C21 = 1.64372_e\text{-}03$ |
| | $C04 = 1.33834_e\text{-}05$ | $C22 = 1.42034_e\text{-}04$ |
| | | $C40 = 7.77143_e\text{-}06$ |
| plane R19 | $C02 = -2.63915_e\text{-}03$ | $C20 = -5.37233_e\text{-}03$ |
| | $C03 = -1.99724_e\text{-}03$ | $C21 = 3.35104_e\text{-}03$ |
| | $C04 = 2.06405_e\text{-}04$ | $C22 = 1.27901_e\text{-}04$ |
| | | $C40 = 6.50230_e\text{-}05$ |
| plane R20 | $C02 = 2.84444_e\text{-}02$ | $C20 = 8.06324_e\text{-}03$ |
| | $C03 = -4.36035_e\text{-}04$ | $C21 = -9.98362_e\text{-}04$ |
| | $C04 = 8.30716_e\text{-}06$ | $C22 = 1.99710_e\text{-}04$ |
| | | $C40 = 1.40741_e\text{-}04$ |

Figure 11:
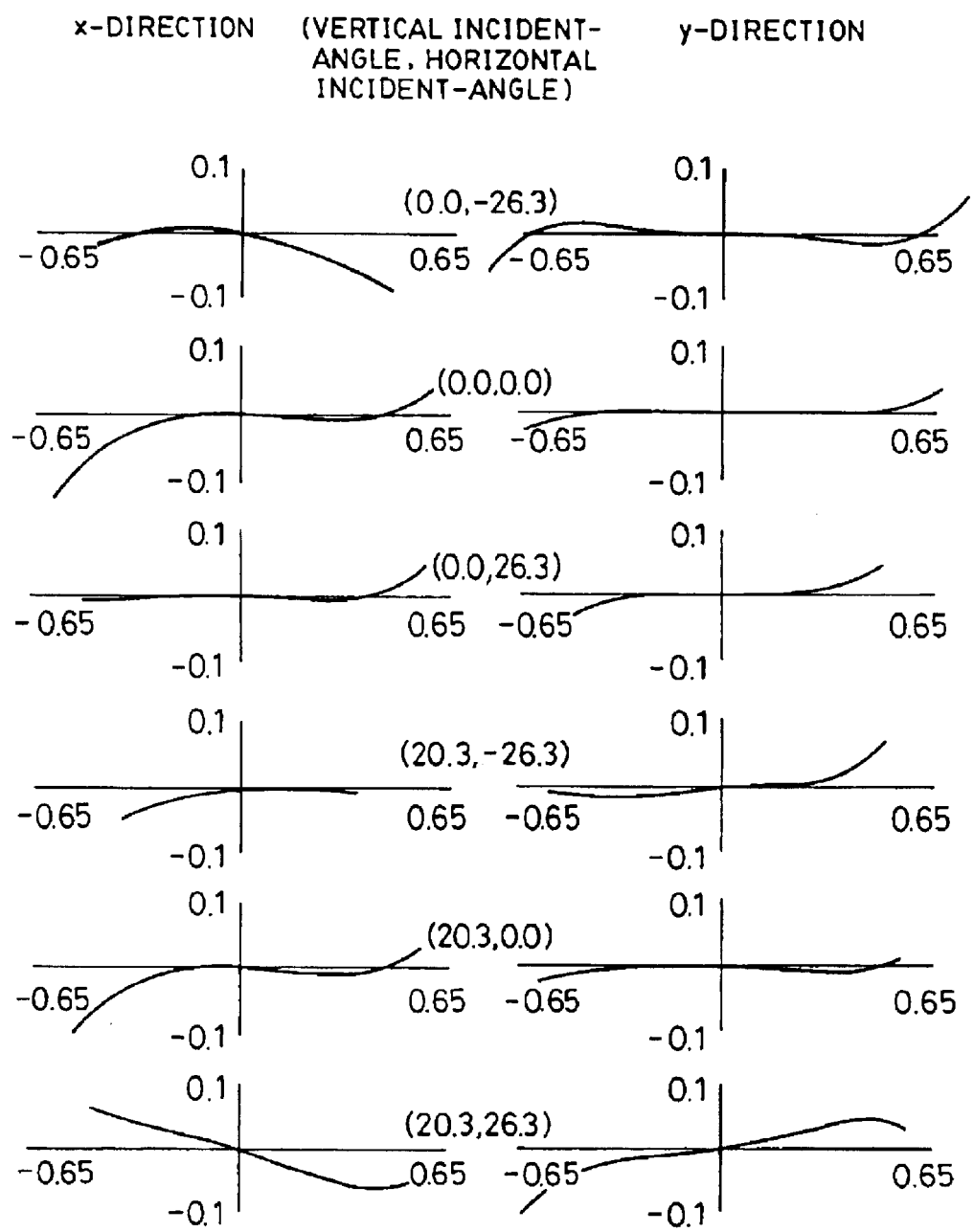
FIG. 11 is a diagram of lateral aberrations (at the wide angle end) of an optical system used for the fourth embodiment.
Figure 12:
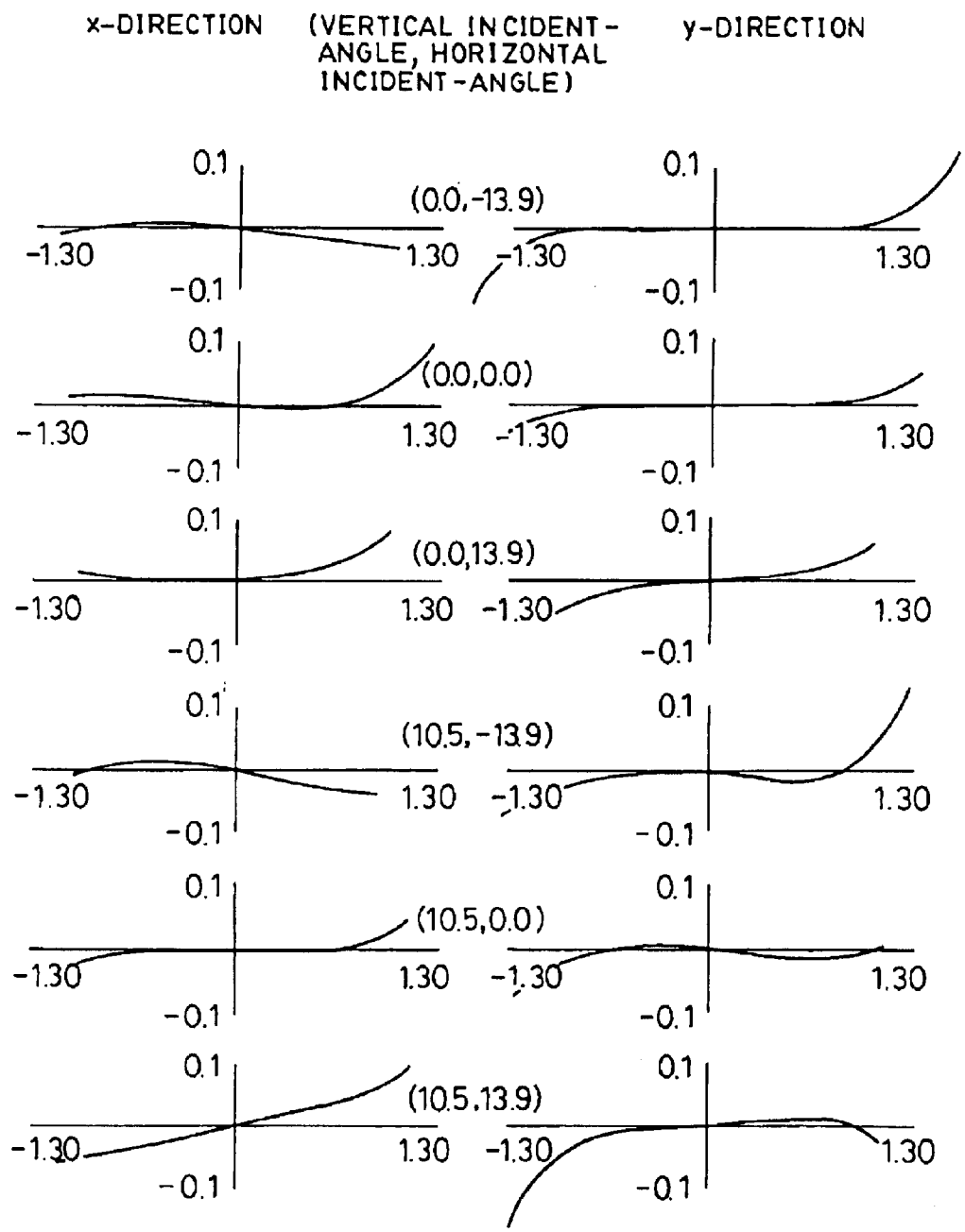
FIG. 12 is a diagram of lateral aberrations (at the intermediate position) of the optical system used for the fourth embodiment.
Figure 13:
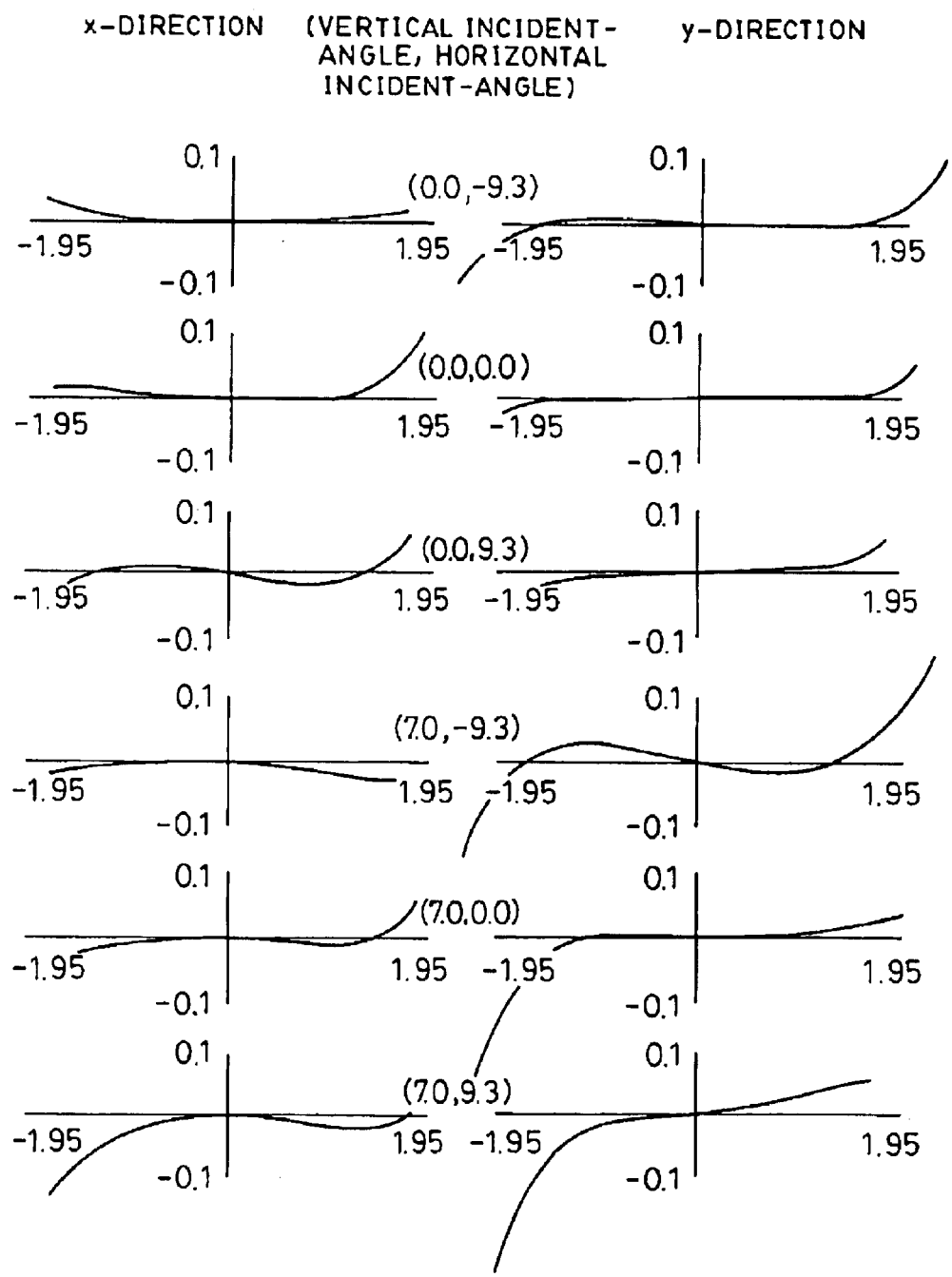
FIG. 13 is a diagram of lateral aberrations (at the telephoto end) of the optical system used for the fourth embodiment.

FIG. 11 to FIG. 13 show diagrams of lateral aberrations of the optical system. The figures illustrate the lateral aberrations of beams at the angles of incidence of (vertical angle of incidence to the plane R1, horizontal angle of incidence thereto)=(0, −uY), (0, 0), (0, uY), (uX, −uY), (uX, 0), and (uX, uY) at the wide angle end (W), medium position (M), and the telephoto end (T). In the diagrams of the lateral aberrations, the abscissa represents the incident height and the ordinate axis represents the amount of aberration. The optical devices according to the fourth embodiment have plane symmetry while the planes have the symmetric plane of the yz-plane and, therefore, the negative and positive directions of vertical angles of view are the same in the diagrams of the lateral aberrations, and the diagrams of the lateral aberrations in the negative directions are omitted.

Figure 9:
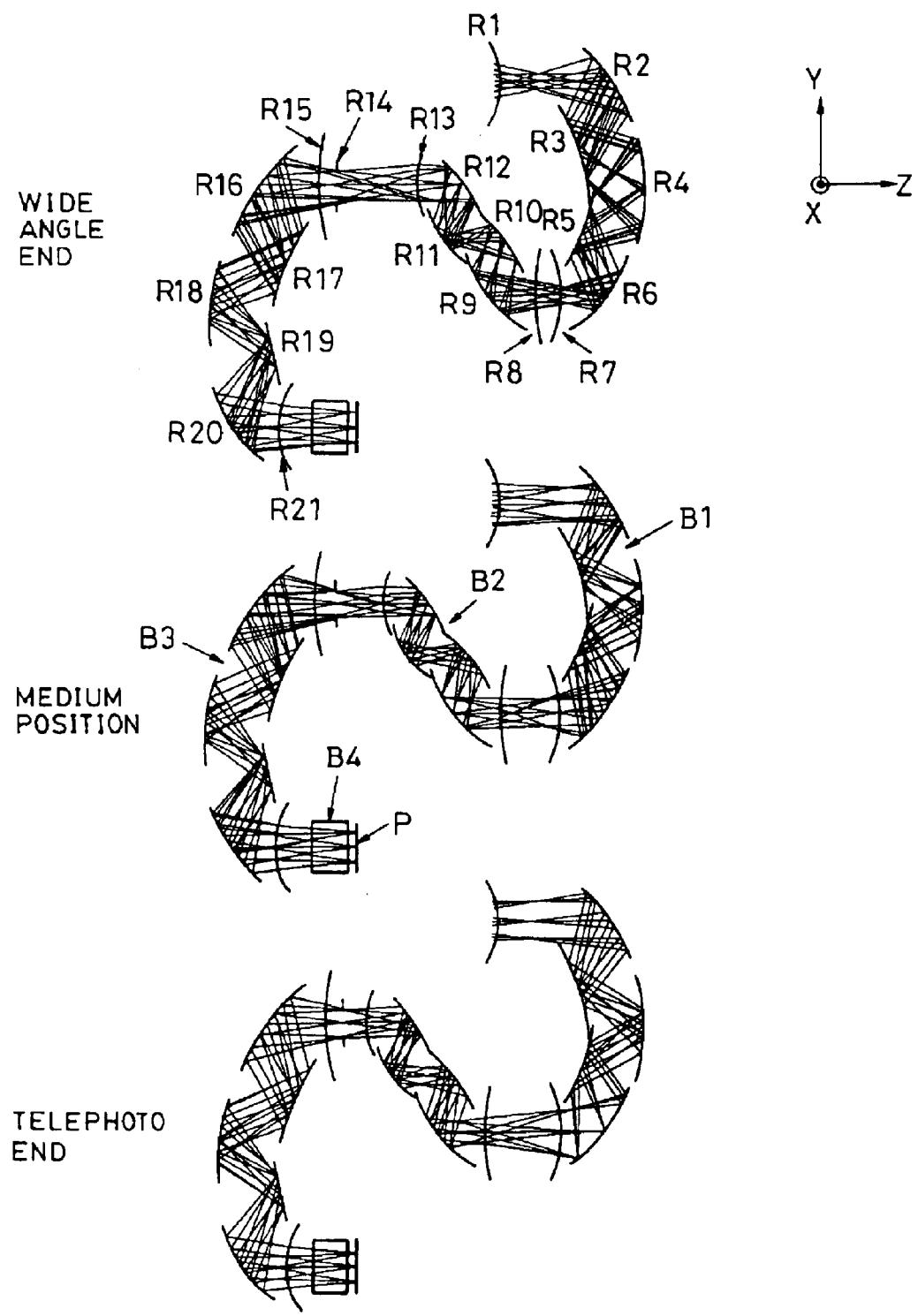
FIG. 9 is an optical cross-sectional view in a YZ-surface in the image pickup system according to the fourth embodiment of the present invention.

Next, the function of forming an image by the three optical devices B1 to B3 when the position of an object is set to be infinite with reference to FIG. 9 will be described. FIG. 9 is an optical cross-sectional view in the YZ-plane of the optical system and the stop S is therein shown by a fourteenth plane R14.

Light of the object which reflects from the flat mirror 63 is made incident to the first optical device B1, is refracted to the first plane R1 of the first optical device B1, is reflected to the second, third, fourth, fifth, and sixth planes R2, R3, R4, R5, and R6, is refracted to the seventh plane R7, and is emitted from the first optical device B1. Here, the light of the object forms the incident pupil between the first and second planes R1 and R2. The pupil is formed near the seventh plane R7. Furthermore, the light of the object is formed into an intermediate image between the third and fourth planes R3 and R4.

The light of the object which is emitted from the first optical device B1 is made incident to the second optical device B2, is refracted to the eighth plane R8 of the second optical device B2, is reflected to the ninth, tenth, eleventh, and twelfth planes R9, R10, R11, and R12, is refracted to the thirteenth plane R13, and is emitted from the second optical device B2. The light of the object is formed into an intermediate image near the ninth plane R9 and the twelfth plane R12. The pupil is formed near the tenth plane R10.

The light of the object which is emitted from the second optical device B2 passes through the fourteenth plane R14 serving as the stop and is made incident to the third optical device B3. The light of the object which is made incident to the third optical device B3 is refracted to the fifteenth plane R15 of the third optical device B3, is reflected to a sixteenth, seventeenth, eighteenth, nineteenth, and twelfth planes R16, R17, R18, R19, and R20, is refracted to a twenty-first plane R21, and is emitted from the third optical device B3. Here, the light of the object forms the pupil near the nineteenth plane R19. Furthermore, the light of the object is formed into an intermediate image near the eighteenth plane R18.

The light of the object which is emitted from the third optical device B3 passes the optical correcting plane B4 and the image is formed on the final image-forming surface.

Sequentially, a description will now be given of the movement of the optical devices according to a zooming operation. The first optical device B1 is fixed and is not moved in the case of the zooming operation. The second optical device B2 is moved in the negative direction of the Z-axis and the zooming operation from the wide angle end to the telephoto end is performed in FIG. 9. The fluctuation of the surface of the image according to the zooming operation is corrected by moving the third optical device B3 and the focusing operation is executed. The surface of the image is not moved in the case of the zooming operation. The first optical device B1 corresponds to a so-called front lens in the photographing optical system, the second optical device B2 corresponds to a variator, and the third optical device B3 corresponds to a compensator.

According to the fourth embodiment, a stop S is disposed between the second and third optical devices B2 and B3. An image through the stop S is formed at negative magnification by using the first and second optical devices B1 and B2 which are disposed at the position on the side of the object which is nearer than that of the stop position. The incident pupil is arranged near the incident surface (between the first plane R1 and the second plane R2). Consequently, an effective diameter of the incident surface can decrease and the flat mirror 63 can also decrease and thus the optical system can become compact as a whole.

According to the fourth embodiment, only the flat mirror 63 is rotated and the field changes, so that a space for changing the field is smaller as compared with the case of rotating the reflecting member and the optical system which is disposed at the position on the side of the object nearer than that of the reflecting member and a lens-barrel which fixes them. Thus, the image pickup unit can become compact and the degrees of freedom of the apparatus main body can increase. Since only the flat mirror 63 may be rotated, power consumption becomes small.

Referring to FIG. 7, reference numeral 64 denotes a motor for rotating the flat mirror 63, and 65 denotes a field change drive circuit for driving the motor 64. The motor 64 and the field change drive circuit 65 correspond to the reflecting member drive circuit. Reference numeral 70 denotes an encoder for detecting a rotary position of the flat mirror 63.

Reference numeral 66 denotes a motor for moving the second optical device B2 (variator) in the image pickup system 61, and 67 denotes a zooming drive circuit for driving the motor 66. The motor 66 and the zooming drive circuit 67 correspond to the zooming circuit.

Reference numeral 68 denotes a motor for moving the third optical device B3 (compensator) in the image pickup system 61, and 69 denotes a focusing drive circuit for driving the motor 68. The motor 68 and the focusing drive circuit 69 correspond to the focusing drive means.

Reference numeral 71 denotes a camera process circuit for converting a video signal from the image pickup device into a standard television signal and outputting the signal from a video output terminal. The television signal which is outputted from the camera process circuit 71 is transmitted to the apparatus main body from the image pickup unit.

Reference numeral 72 denotes an unsharp-width detecting circuit for detecting a so-called unsharp width (width at an edge portion in an image of the object) of the object image among the video signal from the image pickup device 62 and, that is, for detecting an in-focus point by using the nature that as the photographing state is nearer the in-focus state, the unsharp width of the object becomes smaller.

Reference numeral 73 denotes a microcomputer which controls the whole system and has an I/O port, an A/D converter, a ROM, and a RAM. Unsharp width information which is outputted by the unsharp-width detecting circuit 62 and peak-value information having a high frequency component from a band-pass filter (not shown) are inputted to the microcomputer 73. The microcomputer 73 outputs a predetermined drive control signal to the focusing drive circuit 69 on the basis of the information so as to drive the third optical device B3, so that the unsharp width for one field of the video image becomes minimum and the peak value of the high frequency component becomes maximum.

Reference numeral 74 denotes an interface which transmits image data or a signal indicative of an operating state of the image pickup unit to the apparatus main body, and receives an operational signal for controlling the operation of the image pickup unit which is generated by the apparatus main body. The present image pickup unit is connected to the apparatus main body (e.g., the video telephone and the portable terminal having therein the image pickup unit) via the interface 74.

Next, the operation of the image pickup unit will be described. When an operational signal for the field change is transmitted to the microcomputer 73 in the image pickup unit via the interface 74 from a microcomputer (not shown) on the side of the apparatus main body (such as the video telephone and the portable terminal, etc. having therein the image pickup unit), the microcomputer 73 analyzes the operational signal and transmits a drive signal to the field change drive circuit 65. The field change drive circuit 65 drives the motor 64 on the basis of the transmitted drive signal, rotates the flat mirror 63, and changes the field which is photographed by the image pickup system 61.

The microcomputer 73 detects a position of the flat mirror 63 by way of the encoder 70, processes positional information obtained from the encoder 70, and transmits the processed information as field information which is outputted by the image pickup system 61 to the microcomputer in the apparatus main body through the interface 74.

Similarly, if the operational signal for a zooming operation is transmitted to the microcomputer 73 in the image pickup unit from the apparatus main body via the interface 74, the microcomputer 73 analyzes the operational signal and transmits a drive signal to the zooming drive circuit 67. The zooming drive circuit 67 drives the motor 66 on the basis of the transmitted drive-signal and changes the zooming state of the image pickup system 61 by moving the second optical device B2.

An image of the object to be photographed (which is formed on the image pickup surface of the image pickup device 62 by the image pickup system 61) is photoelectrically converted into a video signal by the image pickup device 62 and is amplified by an preamplifier (not shown).

The amplified video signal is subjected to predetermined processes (such as a gamma correction, a blanking process, a process for adding a synchronous signal by the camera process circuit 71) is converted into a standard television signal, and is transmitted to the apparatus main body via the interface 74.

According to the fourth embodiment, in addition to the realization of the compact image-pickup unit and of the saving of a power as mentioned above, the microcomputer 73 is provided in the image pickup unit and performs processes for operations of the image pickup system 61 via the drive circuits 65, 67, and 69. In other words, the processing functions of the operations of the image pickup system 61 are collected together in the image pickup unit. Therefore, it is possible to provide the image pickup unit according to the fourth embodiment as a general unit to a variety of apparatuses. As compared with the case of designing an apparatus having an image pickup system therein, this makes it advantageous to lower the price of the image pickup unit and also the price of the apparatus. Further, as compared with the case in which the microcomputer on side of the apparatus main body has the processing functions for the image pickup unit, the load of the microcomputer on the side of the apparatus main body can decreased.

Although the image data obtained by the image pickup device 62 is converted into the standard television signal when it is transmitted to the apparatus main body, the present invention is not limited to the case of using this method of transmitting the image data.

Although, according to the fourth embodiment, the case in which the unsharp-width detecting circuit 72 is provided and the unsharp width of the image of the object is detected from the video signal from the image pickup device 62 and the focusing operation is executed so that the unsharp width becomes minimum is described, a focusing method other than the foregoing may be adopted to the present invention. For example, a distance measuring unit for measuring a distance to the object may be provided and, in accordance with the output result by the distance measuring unit, the microcomputer 73 may transmit a drive signal to the focus driving circuit and a focus lens is moved, thereby performing the focusing.

Although, according to the fourth embodiment, the case in which the third optical device B3 is driven and, thereby, the focusing is performed is described, in place thereof, the image pickup device 62 may be moved. Further, a light measuring unit for measuring the brightness of the object may be provided and exposure correction may be controlled by driving the stop S by the microcomputer 73 on the basis of information obtained by the light measuring unit, etc.

Although, according to the fourth embodiment, the case in which the zooming drive circuit 67 and the focusing drive circuit 69 are included is described, the present invention does not need those. That is, according to the present invention, the processing functions of the image pickup system may be collected together in the image pickup unit, and it is unnecessary to provide the zooming drive circuit 67 if the second optical device B2 is fixed to a predetermined zooming state. If the image pickup system has a pan focusing operation, it is unnecessary to provide the focusing drive circuit 69 in the image pickup unit.

Further, although, according to the fourth embodiment, the flat mirror 63 is used as a reflecting member, in place thereof, it is sufficient to use a prism having an incident refracting surface, an emitting refracting surface, and at least one reflecting surface for reflecting light which is incident from the incident refracting surface and emitting the light from the emitting refracting surface.

If the reflecting surface of the reflecting member or refracting surface thereof has a curvature, the image pickup system can become smaller. In this case, preferably, an image processing circuit for correcting the distortion of the image photographed by the image pickup device which is caused by the reflecting member may be provided in the camera process circuit 71.

According to the fourth embodiment, although the case in which the field is changed by rotating the flat mirror 63 while the optical axis is set as a central axis is described, the flat mirror may be rotated by setting an axis other than the optical axis as a central axis. The reflecting member may be moved in parallel and the field may be changed.

Furthermore, although according to the three optical devices B1 to B3 of the present embodiment, the case in which the directions of the incident reference axes are almost in parallel to the directions of the emitting reference axes and opposite thereto is described, it is possible to use various optical devices which have incident reference axes whose directions are different from those of the emitting reference axes as disclosed in Japanese Patent Laid-Open Nos. 8-292371, 8-292372, and 9-222561. Thus, it is possible to freely select the motion of the reflecting member for the image pickup medium and to make the whole unit compact.

Hollow-type optical devices all of which are constructed by reflecting surfaces may be used, as disclosed in Japanese Patent Laid-Open Nos. 8-292371 and 8-292372.

Although the case in which the first optical device B1 is fixed is described, the focusing operation may be performed by moving the first optical device B1.

(Fifth Embodiment)

Figure 14:
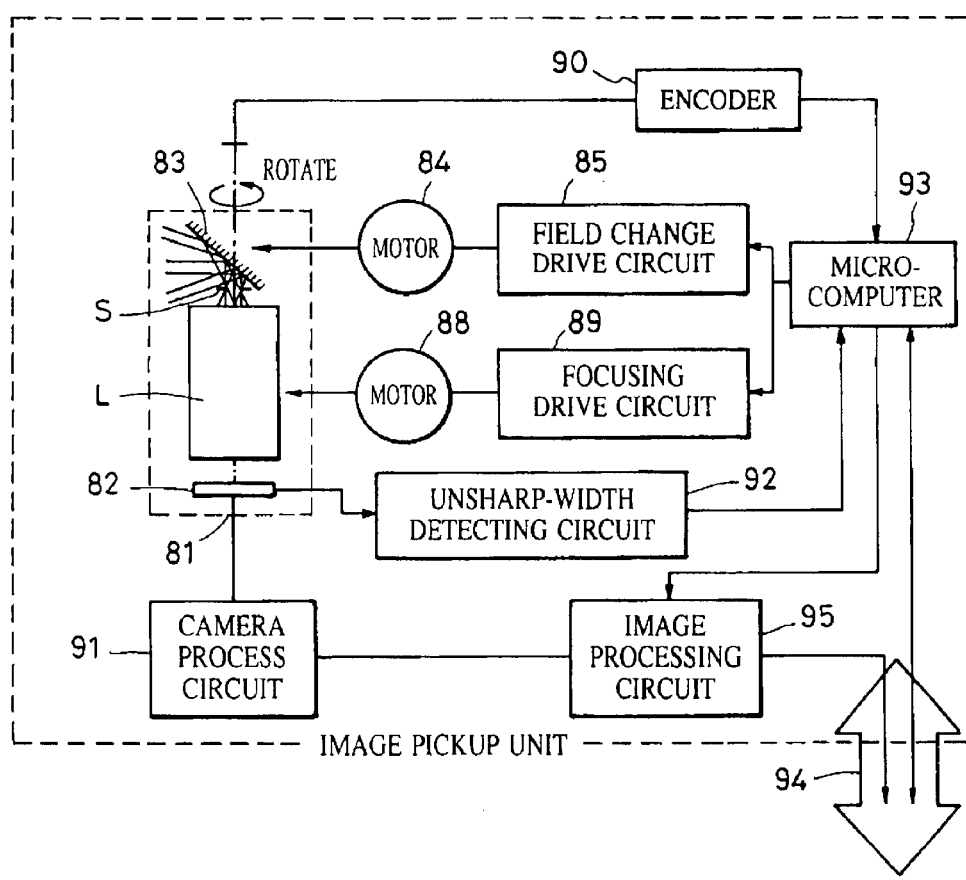
FIG. 14 is a block diagram showing a construction of an image pickup unit according to a fifth embodiment of the present invention.

FIG. 14 illustrates a schematic construction of an image pickup unit according to a fifth embodiment of the present invention. Referring to FIG. 8, reference numeral 81 denotes an image pickup system in which a field can change, and L denotes an optical system which is included in the image pickup system 81.

Reference numeral 83 denotes a flat mirror (reflecting member) which is disposed at the position on the side of an object nearer than that of the optical system L. According to the fifth embodiment, the flat mirror 83 is rotated while an optical axis of the optical device L is set as a central axis and, thereby, an image pickup range (field) of the image pickup device (image pickup medium) 82 can be changed.

The image pickup device 82 included in the image pickup system 81 photoelectrically converts an image of the object (which is formed on an image pickup surface by the optical system L) into a video signal.

As mentioned above, the space necessary for the field change becomes smaller in the case in which only the flat mirror 83 is rotated, as compared with the case in which the portion from the optical plane which is the nearest to the object to the image pickup surface (that is, the whole image pickup system) is rotated.

According to the fifth embodiment, a stop S is provided at the position which is the nearest to the object (near the flat mirror 83) in the optical system L. Therefore, as described in the second embodiment, the size of the flat mirror 83 can decrease.

Reference numeral 84 denotes a motor for rotating the flat mirror 83, and 85 denotes a field change drive circuit for driving the motor 84. The motor 84 and the field change drive circuit 85 correspond to the reflecting member drive circuit. Reference numeral 90 denotes an encoder for detecting a rotary position of the flat mirror 83.

Reference numeral 88 denotes a motor for moving the focus lens (not shown), and 89 denotes a focusing drive circuit for driving the motor 88. The motor 88 and the focusing drive circuit 89 correspond to the focusing drive means.

Reference numeral 91 denotes a camera process circuit for converting a video signal from the image pickup device 82 into a standard television signal, and outputting the signal from a video output terminal. The television signal which is outputted from the camera process circuit 91 is transmitted to an apparatus main body, e.g., a video telephone, and a portable terminal via an interface 94 which is provided in the image pickup unit.

Reference numeral 92 denotes an unsharp-width detecting circuit (in-focus detecting means) for detecting a so-called unsharp width (width at an edge portion in an image of the object) of the object image among the video signal from the image pickup device 82 and, for detecting an in-focus point by using the nature that as the photographing state is nearer the in-focus state, the unsharp width of the object becomes smaller.

Reference numeral 93 denotes a microcomputer which controls the whole system and has an I/O port, an A/D converter, a ROM, and a RAM. Unsharp width information which is outputted by the unsharp-width detecting circuit 92 and peak-value information having a high frequency component from a band-pass filter (not shown) are inputted to the microcomputer 93.

The microcomputer 93 outputs a predetermined drive control signal to the focusing drive circuit 89 on the basis of the information so as to drive the focusing operation of the image pickup system 81, so that the unsharp width for one field of the video image becomes minimum and the peak value of the high frequency component becomes maximum.

Reference numeral 94 denotes the interface which transmits image data or a signal indicative of an operating state of the image pickup unit to the apparatus main body, and receives an operational signal for controlling the operation of the image pickup unit which is generated by the apparatus main body. The present image pickup unit is connected to the apparatus main body (such as the video telephone and the portable terminal having therein the image pickup unit) via the interface 94.

Reference numeral 95 denotes an image processing circuit for performing an image process so that a signal indicated by the television signal (which is outputted from the camera process circuit 91) becomes an erect image irrespective of the rotary position of the reflecting mirror 83 (in other words, the field), and the television signal passes through the image processing circuit 95 and is transmitted to the apparatus main body from the image pickup unit.

The operations of the image processing circuit 95 will be described with reference to FIGS. 15A and 15B, FIG. 16, and FIG. 17. The direction of an image which is formed on an image pickup surface of the image pickup device 82 depends on the number of reflecting surfaces in the optical system including the flat mirror 83 and, therefore, it is assumed that when an object 1 is photographed, the image on the image pickup surface becomes an image which is formed by horizontally inverting the object 1.

Figure 15A:
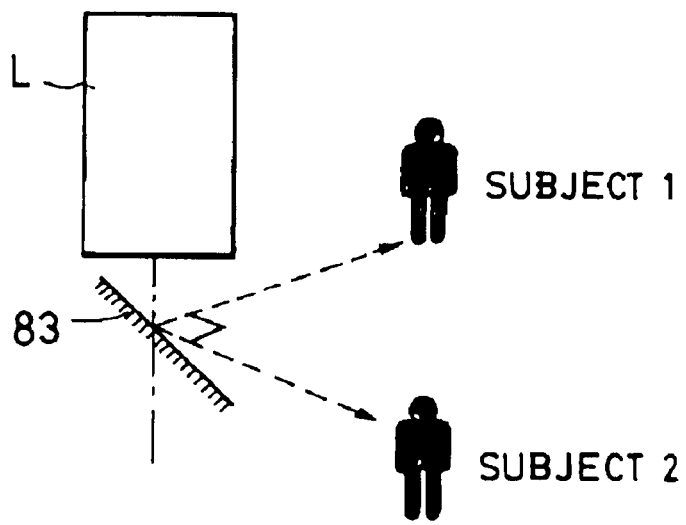
FIGS. 15A and 15B are diagrams showing the operation of the image pickup unit according to the fifth embodiment.
Figure 15B:
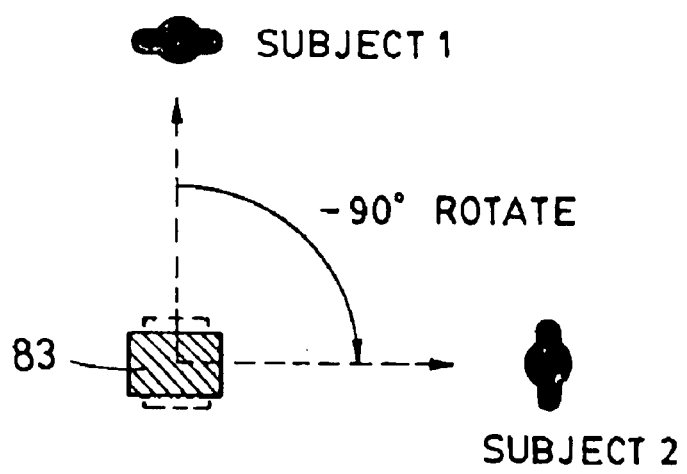

As shown in FIG. 15B, it is assumed that an object 2 is photographed when the flat mirror 83 rotates at −90° to the optical axis when the point at which the object 1 is photographed is set as a reference. Then, an image to be formed becomes an image which is obtained by rotating the object 1 at −90°, as shown in FIG. 16.

If the object 2 is photographed when the flat mirror 83 further rotates at −90° to the optical axis, an image to be formed becomes an image which is obtained by vertically inverting the object 1. Furthermore, an image to be formed if the flat mirror 83 rotates at −90° becomes an image which is obtained by rotating the object 1 at 90°. As mentioned above, the image which is formed on the image pickup surface in accordance with the rotation of the flat mirror 83, as shown in FIG. 16.

Figure 16:
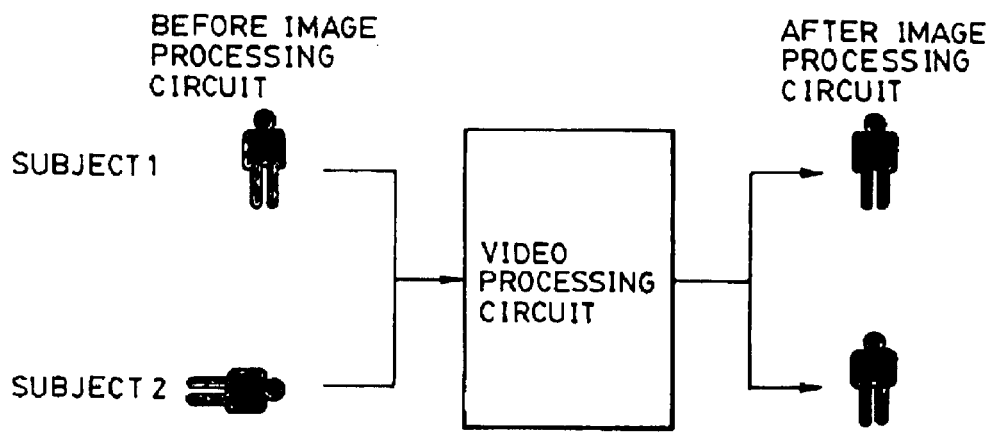
FIG. 16 is a diagram showing the operation of an image processing circuit which is provided in the image pickup unit according to the fifth embodiment.

The image processing circuit 95 executes image processes for obtaining erect images corresponding to the directions, e.g., the horizontal inversion, rotation of −90°, and vertical inversion, in accordance with the field change, as shown in FIG. 16.

It is possible to supply an image of the object which is always erect to the apparatus main body even when the field changes at 360°, by providing the image processing circuit 95.

Figure 17:
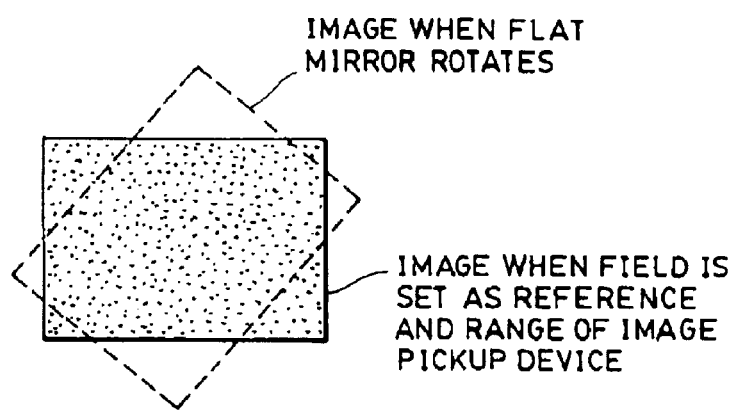
FIG. 17 is a diagram in which an image rotates against an image pickup device in accordance with the rotation of a reflecting member.
Figure 18:
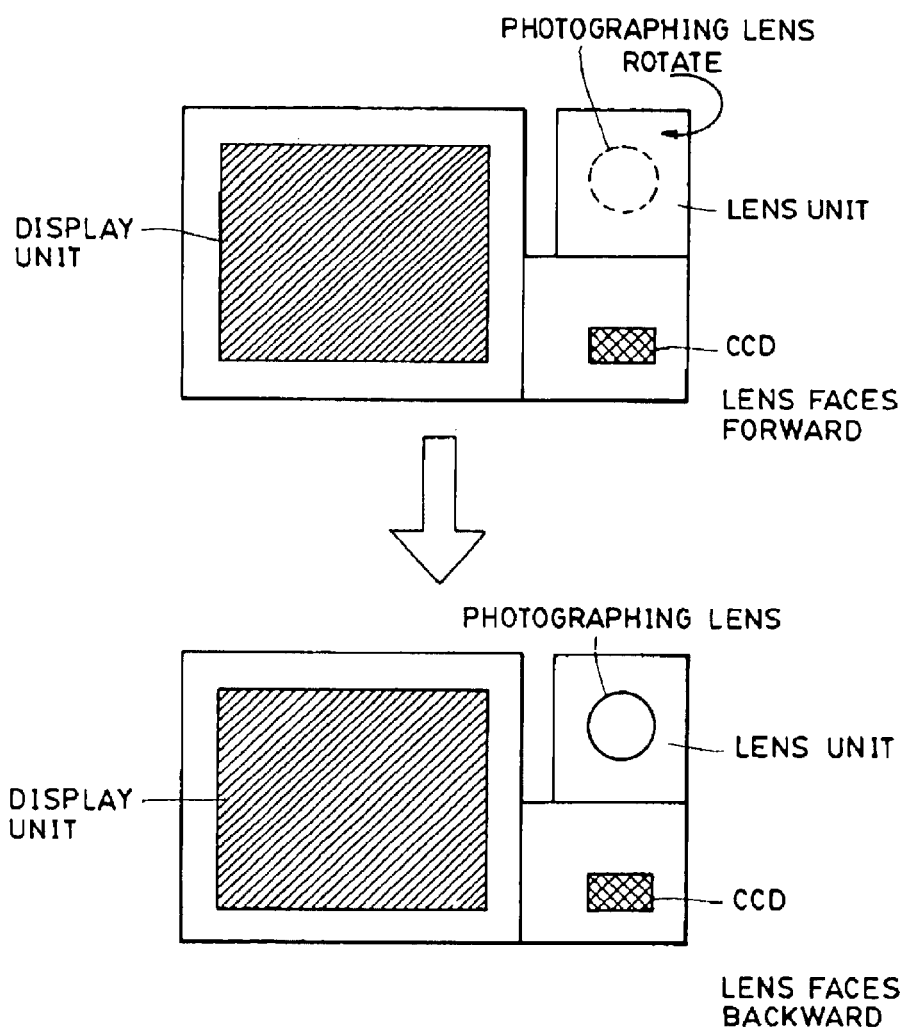
FIG. 18 is a diagram of a conventional camera in which a field can change.
Figure 19:
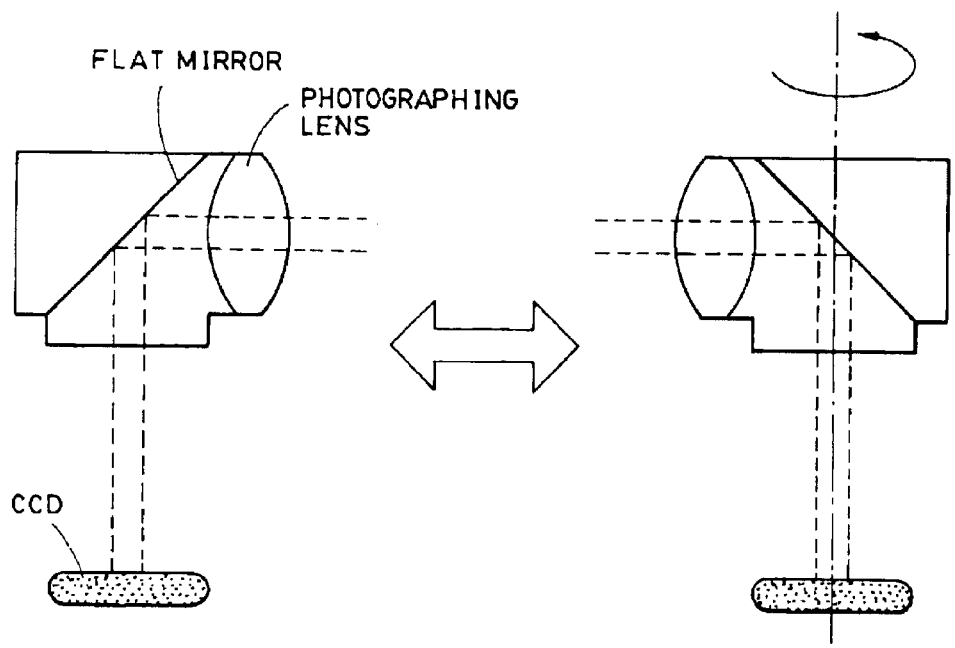
FIG. 19 is a diagram showing the operation of a conventional camera in which the field can change.

As shown in FIG. 17, there is a danger that rotation of the image will cause vignetting in the obtained image.

In order to prevent this danger, preferably, an image pickup device having a photographed surface larger than the actual specification may be used and the necessary smaller image may be extracted therefrom.

Although, according to the present embodiment, the case in which the image processing circuit for the image processing is provided so as to obtain the erect object image is described, the image pickup device itself may be rotated in accordance with the field change.

Next, the operation of the image pickup unit will be described. When the operational signal for the field change is transmitted to the microcomputer 93 in the image pickup unit via the interface 94 from a microcomputer (not shown) on the side of the apparatus main body (such as the video telephone and the portable terminal having therein the image pickup unit), the microcomputer 93 analyzes the operational signal and transmits a drive signal to the field change drive circuit 85. The field change drive circuit 85 drives the motor 84 on the basis of the drive signal transmitted, rotates the motor 84, and changes the field which is photographed by the image pickup system 81.

The microcomputer 93 detects a position of the flat mirror 83 by way of the encoder 90, processes positional information obtained from the encoder 90, and transmits the processed information as field information which is outputted by the image pickup system 81 to the microcomputer on the side of the apparatus main body, through the interface 94.

An image of the object to be photographed (which is formed on the image pickup surface of the image pickup device 82 by the image pickup system 81) is photoelectrically converted into a video signal by the image pickup device 82 and is amplified by a preamplifier (not shown).

The amplified video signal is subjected to predetermined processes such as a gamma correction, blanking process, process for adding a synchronous signal by the camera process circuit 91, and is converted into a standard television signal. An image processing circuit 95 performs an image process to obtain an erect image in response to the television signal which is transmitted from the camera process circuit 91. The image process is performed, and the image-processed signal is transmitted to the apparatus main body via the interface 94.

According to the fifth embodiment, the optical system L of the front stop is used, therefore the flat mirror 83 becomes small. Further, only the small flat mirror 83 is rotated and, thereby, the field changes. Consequently, it is possible to decrease a space for changing the field and make the image pickup unit more compact, as compared with not only the case of rotating the whole image pickup system but also the case of rotating the flat mirror 3 and the portion comprising the optical system at the position on the side of the object nearer than that of the flat mirror 3, as shown in first embodiment.

Accordingly, the degrees of freedom of the apparatus main body can increase. Since the rotary portion of the image pickup system 81 is small, power consumption becomes small, and the power consumption of the whole apparatus can be reduced.

Besides, according to the fifth embodiment, the microcomputer 93 is provided in the image pickup unit and performs processes for operations of the image pickup system 81 via the drive circuits 85 and 89. The image processing circuit 95 executes a process for obtaining an erect image irrespective of the field. In other words, the processing functions for the operations of the image pickup system 81 and the photographed image are collected together in the image pickup unit. Therefore, it is possible to provide the image pickup unit according to the present embodiment as a general unit to a variety of apparatuses. As compared with the case of designing an apparatus having an image pickup system therein, this makes it advantageous to lower the price of the image pickup unit and also the price of the apparatus. Further, as compared with the case in which the microcomputer on side of the apparatus main body has the processing functions for the image pickup unit, the load of the microcomputer on the side of the apparatus main body can be decreased.

Although, according to the fifth embodiment, the image data obtained by the image pickup device 82 is converted into the standard television signal when it is transmitted to the apparatus main body, the present invention is not limited to the case of using this method of transmitting the image data.

Although, according to the fifth embodiment, the case in which the unsharp-width detecting circuit 92 is provided and the unsharp width of the image of the object is detected from among the video signal from the image pickup device 82 and the focusing operation is executed so that the unsharp width becomes minimum is described, a focusing method other than the foregoing may be adopted to the present invention. For example, a distance measuring unit for measuring a distance to the object may be provided and, in accordance with the output result by the distance measuring unit, the microcomputer 93 may transmit a drive signal to the focus driving circuit 89 and a focus lens may be moved, thereby performing the focusing.

Although, according to the fifth embodiment, the case in which the focus lens is driven and, thereby, the focusing is performed is described, in place thereof, the image pickup device 82 may be moved. Further, a light measuring unit for measuring the brightness of the object may be provided, and exposure correction may be controlled by driving the stop S by the microcomputer 93 on the basis of information obtained by the light measuring unit.

Although, according to the fifth embodiment, the case in which the focusing drive circuit 89 is included is described, the present invention does not need the focusing drive circuit 89. That is, according to the present invention, the processing functions of the image pickup system may be collected together in the image pickup unit. If the image pickup system has a pan focusing operation, it is unnecessary to provide the focusing drive circuit 89 in the image pickup unit.

Further, although, according to the fifth embodiment, the flat mirror 83 is used as a reflecting member, in place thereof, it is sufficient to use a prism having an incident refracting surface, an emitting refracting surface, and at least one reflecting surface for reflecting light which is incident from the incident refracting surface and emitting the light from the emitting refracting surface.

If the reflecting surface of the reflecting member or refracting surface thereof has a curvature, the image pickup system can become smaller. In this case, distortion of the image is often caused by the reflecting member and therefore, preferably, for example, an image processing circuit for correcting the distortion of the image photographed by the image pickup device may be provided.

According to the fifth embodiment, although the case in which the field is changed by rotating the flat mirror 83 while the optical axis is set as a central axis is described, the flat mirror 83 may be rotated by setting an axis other than the optical axis as a central axis. The reflecting member may be moved in parallel and the field may be changed.

As mentioned above, the image pickup unit according to the above-described embodiments adopts an image pickup system in which the image pickup range of the image pickup medium changes by driving the reflecting member (which is disposed at the position on the side of the object nearer than that of the optical system), alternatively, by driving the reflecting member which is disposed in the optical system and the portion comprising the optical system (which is located at the position on the side of the object nearer than that of the reflecting member). The range change may also be effected. Thus, the space necessary for varying in the image pickup range (field) is small, and not only the image pickup system but also the image pickup unit including such a system can become compact. The degrees of freedom of an apparatus main body having therein the image pickup unit can increase. Further, the image pickup range changes by driving the reflecting member or by driving only the portion comprising the optical system on the side of the object nearer than that of the reflecting member. Thereby, power consumption can be decreased as compared with that in the case of rotating the whole camera or the whole image pickup system.

Moreover, the image pickup unit preferably has therein a drive circuit for driving the change in the image pickup range, an interface for enabling communication with an apparatus main body, and a microcomputer for controlling the driving operation of the change in image pickup range on the basis of a signal from the apparatus main body. Processing functions for at least the field change operation of the image pickup system may be collected together in the image pickup unit. Accordingly, it is possible to realize a generalized and compact image-pickup unit in which the image pickup range can change, and to provide such an image pickup unit in various apparatuses. This results in making it remarkably advantageous to reduces costs of the image pickup unit and to decrease the price of the apparatus which has therein the image pickup unit.

Incidentally, the optical system of the image pickup unit has a stop which is located at a position which is the nearest to the object, or has a stop in the optical system. Advantageously, if using the stop in a manner such that an image through the stop is formed on the side of the object nearer than that of the stop at the negative magnification by the portion comprising the optical system thereon, an increase in the optically effective diameter on the plane of incidence can be reduced as compared with the conventional optical system having only the refracting optical device, and the optical system and the image pickup unit can become compact.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image pickup unit comprising:
   an image pickup medium;
   an optical system through which an image of an object is formed on said image pick medium, said optical system comprising an optical element having (i) an incident refracting surface, (ii) an emitting refracting surface, and (iii) a plurality of reflecting surfaces to which light incident in said optical element from said incident refracting surface is sequentially reflected on each of the plurality of reflecting surfaces and is emitted from said emitting refracting surface;
   a reflecting member which is disposed at a position on a side of the object nearer than that of said optical system, and which reflects light from the object so that the light is made incident on said optical system;
   reflecting member drive means which drives said reflecting member;
   an interface for enabling communication with an apparatus main body, the apparatus main body (i) having therein said image pickup unit and (ii) generating a signal to control an operation of said image pickup unit; and
   a microcomputer which transmits information on a side of the image pickup unit to said apparatus main body and controls said reflecting member drive means on the basis of the signal received from said apparatus main body,
   wherein said reflecting member drive means drives said reflecting member to change an orientation of an image pickup field of said image pickup medium.

2. A unit according to claim 1, further comprising:
   a stop which is disposed on the object side of said optical system.

3. A unit according to claim 1, further comprising:
   a stop which is disposed in said optical system,
   wherein an image through said stop is formed at a position on the side of the object nearer than that of said stop at a negative magnification, by a portion comprising the optical system.

4. A unit according to claim 3, wherein the portion comprising the optical system at the position on the side of the object nearer than that of said stop comprises said optical element.

5. A unit according to claim 1, wherein said optical system has a plurality of optical components, and further comprising a driver which changes relative positions of said plurality of optical components, to perform zooming.

6. A unit according to claim 5, further comprising:
   zooming drive means which drives at least one optical component so as to change the relative positions of said plurality of optical components, and wherein said microcomputer controls said zooming drive means on the basis of the signal from said apparatus main body.

7. A unit according to claim 1, further comprising a driver which moves at least one part of the optical components comprising said optical system to perform focusing.

8. A unit according to claim 1, further comprising a drive which moves said image pickup medium to perform focusing.

9. A unit according to claim 1, further comprising:
   distance measuring means which measures a distance to the object to be photographed; and
   focusing drive means which drives a focusing operation, and wherein said microcomputer controls said focusing drive means on the basis of a result measured by said distance measuring means.

10. A unit according to claim 1, further comprising:
    in-focus detecting means which detects an in-focus state of the object to be photographed; and
    focusing drive means which drives a focusing operation, and wherein said microcomputer controls said focusing drive means on the basis of a result detected by said in-focus detecting means.

11. A unit according to claim 1, further comprising:
    light measuring means which measures a brightness of the object to be photographed; and
    exposure correcting means which corrects an exposure of said image pickup medium, and wherein said microcomputer controls said exposure correcting means on the basis of a result detected by said light measuring means.

12. A unit according to claim 1, further comprising:
    image processing means which processes image data so that the image photographed by said image pickup medium becomes an erect image, irrespective of an orientation of said image pickup field.

13. A unit according to claim 1, further comprising:
    image pickup medium rotating means for rotating said image pickup medium in accordance with an orientation change in said image pickup field.

14. An apparatus comprising an image pickup unit comprising a unit according to claim 1.

15. An image pickup unit comprising:
    an image pickup medium;
    an optical system through which an image of an object is formed on said image pick medium, said optical system comprising an optical element having (i) an incident refracting surface, (ii) an emitting refracting surface, and (iii) a plurality of reflecting surfaces to which light incident in said optical element from said incident refracting surface is sequentially reflected on each of the plurality of reflecting surfaces and is emitted from said emitting refracting surface;
    a reflecting member which is disposed in said optical system, and to which light from the object incident through a portion comprising said optical system and disposed on a side of the object nearer than that of said reflecting member is reflected and is made incident to said portion;

a driver which drives said reflecting member and said portion to change an orientation of an image pickup field of said image pickup medium;

reflecting member drive means which drives said reflecting member;

an interface which provides communication with an apparatus main body, said apparatus main body (i) having therein said image pickup unit and (ii) generating a signal to control an operation thereof; and a microcomputer which (i) transmits information on the side of the image pickup unit to said apparatus main body and (ii) controls said reflecting member drive means on the basis of the signal received from said apparatus main body.

16. A unit according to claim 15, wherein said optical system comprises a stop near the reflecting member.

17. An apparatus comprising an image pickup unit according to claim 15.

* * * * *

UNITED STATES PATENT AND TRADEMARK OFFICE
CERTIFICATE OF CORRECTION

PATENT NO. : 6,831,693 B1
DATED : December 14, 2004
INVENTOR(S) : Toshihiro Sunaga It is certified that error appears in the above-identified patent and that said Letters Patent is hereby corrected as shown below:

Column 2,
Line 19, "position--which" should read -- position which --,
Line 25, "the" should read -- in --, and
Line 44, "etc." should read -- etc., --.

Column 6,
Line 33, "terminal etc." should read -- terminal, etc., --.

Column 9,
Line 36, "etc." should read -- etc., --.

Column 10,
Line 44, "on side" should read -- on the side --, and
Line 47, "can decreased." should read -- can be decreased. --.

Column 13,
Line 32, "angel" should read -- angle --.

Column 14,
Line 47, "of," should read -- of: --.

Column 15,
Line 31, "body" should read -- body, --.

Column 16,
Line 19, "an" should read -- a --, and
Line 58, "decreased." should read -- be decreased. --.

Column 18,
Line 12, "comprises" should read -- comprise --,
Line 34, "comprises" should read -- comprised --,
Line 36, "comprises by" should read -- comprised of --, and
Line 37, "etc." should read -- etc., --.

Column 22,
Line 59, "etc." should read -- etc., --.

Column 23,
Line 41, "can decreased." should read -- can be decreased. --.

UNITED STATES PATENT AND TRADEMARK OFFICE
CERTIFICATE OF CORRECTION

PATENT NO. : 6,831,693 B1
DATED : December 14, 2004
INVENTOR(S) : Toshihiro Sunaga It is certified that error appears in the above-identified patent and that said Letters Patent is hereby corrected as shown below:

Column 27,
Line 40, "on side" should read -- on the side --.

Column 29,
Lines 54 and 57, "comprising:" should read -- comprising --.

Column 30,
Lines 5, 41 and 46, "comprising:" should read -- comprising --.

Signed and Sealed this

Fifth Day of July, 2005

JON W. DUDAS
*Director of the United States Patent and Trademark Office*